US010356575B1

(12) United States Patent
Casey et al.

(10) Patent No.: US 10,356,575 B1
(45) Date of Patent: Jul. 16, 2019

(54) SYSTEM AND METHOD FOR NETWORK PROVISIONING

(71) Applicant: CSG Media, LLC, Chicago, IL (US)

(72) Inventors: Sean Casey, Chicago, IL (US); Michael Mueller, Tinley Park, IL (US); Anish Shah, Westmont, IL (US); Doug Savage, Gibsons (CA)

(73) Assignee: CSG Media, LLC, Chicago, IL (US)

( * ) Notice: Subject to any disclaimer, the term of this patent is extended or adjusted under 35 U.S.C. 154(b) by 0 days.

(21) Appl. No.: 16/057,955

(22) Filed: Aug. 8, 2018

(51) Int. Cl.
G06Q 30/00 (2012.01)
H04W 4/23 (2018.01)
H04W 4/24 (2018.01)
G06Q 30/04 (2012.01)
G06Q 30/06 (2012.01)

(52) U.S. Cl.
CPC ............ H04W 4/23 (2018.02); G06Q 30/04 (2013.01); G06Q 30/0631 (2013.01); H04W 4/24 (2013.01)

(58) Field of Classification Search
CPC ...................................................... H04W 4/23
See application file for complete search history.

(56) References Cited

U.S. PATENT DOCUMENTS

2008/0319650 A1* 12/2008 Aaltonen ............... G06Q 30/02
701/408
2013/0304616 A1* 11/2013 Raleigh ............... G06Q 20/145
705/34
2016/0189214 A1* 6/2016 Dai .................... G06Q 30/0255
705/14.53

OTHER PUBLICATIONS

Kounavis, M. E., Campbell, A. T., Ito, G., & Bianchi, G. (2001). Design, implementation and evaluation of programmable handoff in mobile networks. Mobile Networks and Applications, 6(5), 443. Retrieved from https://search.proquest.com/docview/205027783?accountid=14753 (Year: 2001).*

* cited by examiner

Primary Examiner — Michael Misiaszek
Assistant Examiner — Jason B Warren
(74) Attorney, Agent, or Firm — Fitch, Even, Tabin & Flannery LLP

(57) ABSTRACT

An electronic tool is arranged to configure elements in an electronic communication network and the electronic tool is deployed at a central location. A control circuit is configured to execute decision logic and execution of the decision logic is effective to construct an appropriate product or service offer for the customer based upon parameters entered by the customer. A transceiver circuit receives acceptance of the offer and the control circuit responsively creates electronic signals that provision electronic elements in an electronic communication network to implement the product or service offer.

17 Claims, 21 Drawing Sheets

SYSTEM AND METHOD FOR NETWORK PROVISIONING

TECHNICAL FIELD

This disclosure relates to provisioning electronic networks and/or billing systems based upon customer product or service selections.

BACKGROUND

Various types of products or services can be purchased in different ways. For example, different products can be purchased over the internet. One type of electronic product that can be purchased is a wireless device such as a smartphone. Often, the purchaser of the device also wishes to subscribe to a service plan.

In order for the service plan to be implemented, the network needs to be provisioned and a billing arrangement needs to be arranged. In previous systems, complicated and separate arrangements were utilized to configure the network and finalize a billing arrangement. This led to user frustration with these previous approaches.

BRIEF DESCRIPTION OF THE DRAWINGS

For a more complete understanding of the disclosure, reference should be made to the following detailed description and accompanying drawings wherein.

DETAILED DESCRIPTION

Figure 1:
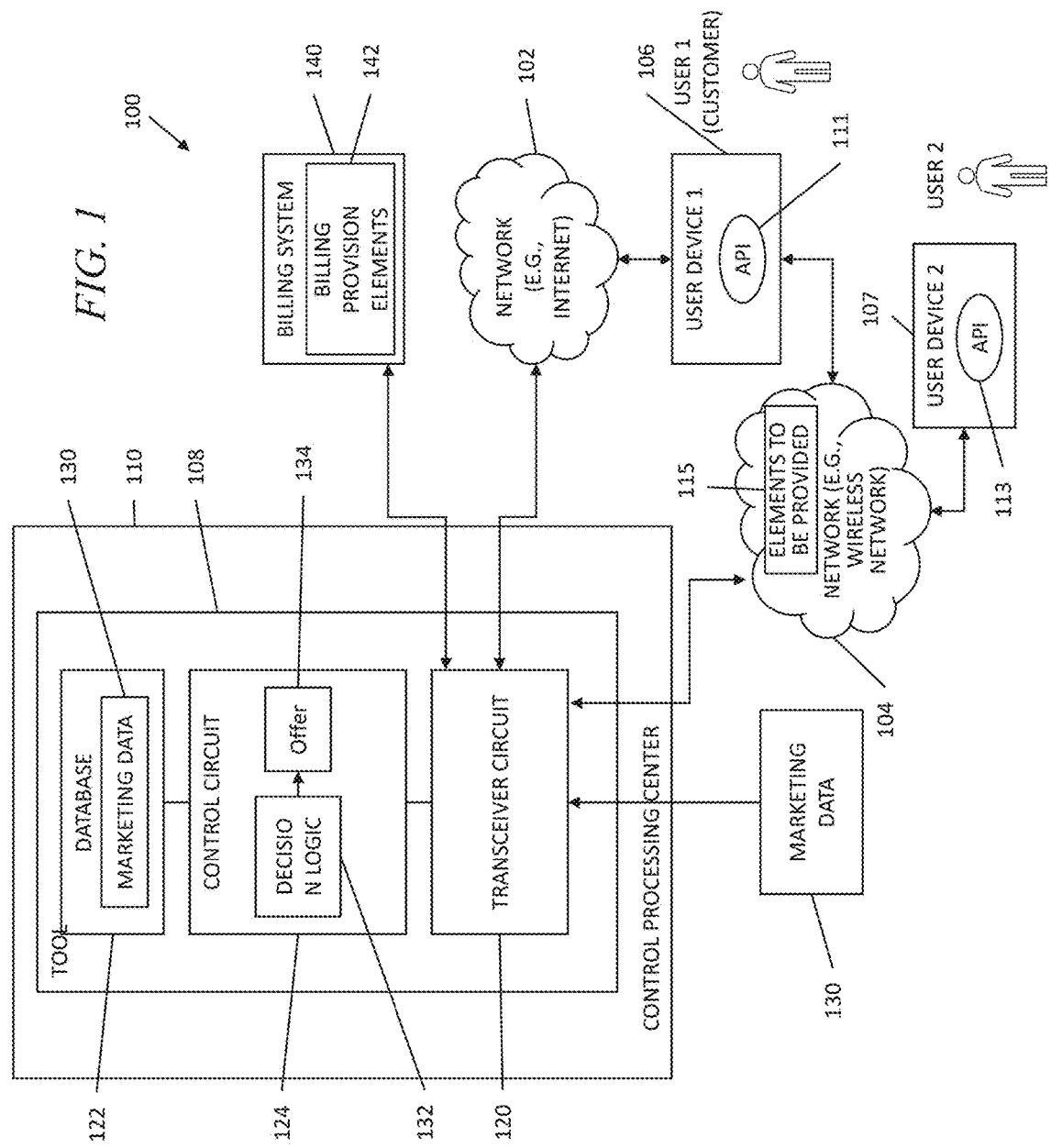
FIG. 1 comprises a diagram of a system as configured in accordance with various embodiments of these teachings.

Generally speaking, a system and method are utilized to configure an electronic network and arrange for billing of the usage of the network. Billing and electronic provisioning of network elements are handled seamlessly, automatically, and by a single action of a user (e.g., a user selecting a product offer).

An offer may include a bundle of products and/or services constructed based on the decision logic. To create the offer, one or more option sets are chosen.

In aspects, a customer selects one general offer (from multiple general offers), but once this general offer is selected, the customer then selects from the options sets (based on execution of decision logic) to fully populate or define the offer. In other words, the option sets fully customize a general offer to a specific offer for a specific customer. In one specific example, a wireless customer selects between a first general offer from a first smartphone manufacturer and/or service provider, and a second general offer from a second smartphone manufacturer and/or service provider. Depending upon the general offer selected, a series of option sets are then provided and presented to the customer according to decision logic, which enforces business rules to fully construct or define the offer.

In many of these embodiments, a system configures elements in an electronic communication network. The system includes a first electronic communication network, a second electronic communication network, a user electronic device, and an electronic tool.

The user electronic device includes an electronic display. The user electronic device is coupled to the first electronic communication network and the second electronic communication network.

The electronic tool is deployed or disposed at a central location and includes a transceiver circuit, a database, and a control circuit. The electronic tool is coupled to the first electronic communication network and the second electronic communication network.

The transceiver circuit receives marketing data and the marketing data is stored in the database. The control circuit is configured to execute decision logic, and execution of the decision logic is effective to construct an appropriate product or service offer for the customer based upon parameters entered by the customer at the user electronic device. The parameters are received from the user electronic device at the transceiver circuit via the first electronic communication network. The offer incorporates at least some of the marketing data and comprises an electronic visualization of one or more products or services for sale to a customer. The customer may first select a general offer and then select options from offer sets presented to the customer as the decision logic is executed.

The offer is transmitted by the transceiver circuit across the first electronic communication network and rendered on the screen of the user electronic device for viewing by the customer. The customer indicates an acceptance of the product or service offer at the user electronic device. The acceptance is transmitted via the first electronic communication network to the transceiver circuit. The transceiver circuit receives the acceptance and the control circuit responsively creates one or more electronic signals that are effective in provisioning one or more electronic elements in the second electronic communication network to implement the product or service offer. The control circuit transmits a message to an electronic billing system via the transceiver circuit to accommodate the product or service offer.

Incorporation of the marketing information into the appropriate product or service offer, the provisioning of the second network, and the accommodation of billing information associated with the appropriate product or service offer are performed automatically and seamlessly with the single electronic tool without the use of other tools or processes.

In examples, the marketing data comprises pictures, videos, text, and instructions as to picture placement. Other examples are possible.

In other examples, the parameters entered by a customer or user as the decision logic is executed include a data rate or a cost of the product offer. Other examples are possible.

In yet other examples, a communication to implement the offer is performed automatically and seamlessly with the single electronic tool. In other aspects, the decision logic includes multiple execution paths determined by the parameters entered.

In still other examples, the second electronic communication network is a wireless communication network. In yet other examples, the first electronic communication network comprises the internet.

The user electronics device may be a smartphone, a laptop computer, a tablet computer, or a personal computer. Other examples are possible.

In others of these embodiments, marketing data is collected at a single electronic tool and stored in a database at the electronic tool. Decision logic is defined at the electronic tool. The decision logic allows a customer to obtain an appropriate product or service offer based upon parameters entered by the customer and utilized by the decision logic.

Once defined, the decision logic is executed at the electronic tool to obtain the appropriate product or service offer. The offer incorporates at least some of the marketing data comprises electronic visualizations of one or more products or services for sale to a customer and to be rendered on an electronic display.

At the electronic display, the appropriate product or service offer that has been determined by executing the decision logic is rendered. A customer accepts the offer, generating an acceptance. The acceptance of the product or service offer by the customer is received at the tool and the tool responsively provisions one or more electronic elements in an electronic communication network to implement the product or service offer. The tool also transmits a message to an electronic billing system to accommodate the product or service offer.

The incorporation of the marketing information into the appropriate product or service offer, the provisioning of the network, and the accommodation of billing information associated with the appropriate product or service offer are performed automatically and seamlessly with the single electronic tool without the use of other tools or processes.

In still others of these embodiments, an electronic tool is arranged to configure elements in an electronic communication network and the electronic tool is deployed or disposed at a central location. The tool includes a transceiver circuit, a database, and a control circuit.

The transceiver circuit is coupled to a first electronic communication network and a second electronic communication network. The control circuit is coupled to the database and the transceiver circuit.

The transceiver circuit receives marketing data that is stored in the database. The control circuit is configured to execute decision logic and execution of the decision logic is effective to construct an appropriate electronic product or service offer for the customer based upon parameters entered by the customer at a user electronic device. The user electronic device includes an electronic display.

The parameters are received from the user electronic device at the transceiver circuit via the first electronic communication network. The electronic offer incorporates at least some of the marketing data and comprises an electronic visualization of one or more products or services for sale to a customer.

The electronic offer is transmitted by the transceiver circuit across the first electronic communication network and rendered on the screen of the user electronic device for viewing by the customer. The customer indicates an acceptance of the product or service offer at the user electronic device, the acceptance being transmitted via the first electronic communication network to the transceiver circuit. The transceiver circuit receives the acceptance and the control circuit responsively creates one or more electronic signals that are effective in provisioning one or more electronic elements in the second electronic communication network to implement the product or service offer. The control circuit transmits a message to an electronic billing system via the transceiver circuit to accommodate the product or service offer.

The incorporation of the marketing information into the appropriate product or service offer, the provisioning of the second network, and the accommodation of billing information associated with the appropriate product or service offer are performed automatically and seamlessly with the single electronic tool without the use of other tools or processes.

In the approaches described herein, marketing data (e.g., pictures, videos, and text) is obtained and stored in a database. An electronic offer is created by the traversal of decision logic. In aspects, the offers include or incorporate the marketing data. The present approaches also facilitate changing marketing materials on-the-fly. For instance, a video or pictorial content of a product offer may be dynamically changed based upon time of day, geographic area, or feedback from customers.

The execution of the decision logic allows an appropriate electronic offer to be created, constructed, or defined for a user according to parameters entered by the user. The user selects the offer, and upon the user's selection, the network is automatically provisioned, and the billing system is automatically arranged to bill for the selected offer. The business logic may define business rules that achieve business goals.

The seamless and automatic network provisioning and billing approaches described herein provide a more efficient and faster computer operation. Underlying computer hardware utilized in the present approaches operates faster than it normally would operate because processing operations may occur parallel. Alternatively, processes and operations may occur serially (without having to stop and switch jobs) also resulting in faster operations.

The approaches described herein also result in more efficient system operations. In aspects, a single "call" or acceptance of an offer results in the automatic performance of multiple operations resulting in much more efficient operations than approaches where multiple tools are used, and processes instigated at disparate times.

In other aspects, the electronic offer that is rendered to a customer may originate as an electronic template that is physically transformed by the physical introduction of visual marketing materials or other types of information into the templates. In other words, the template is physically modified according to the approaches described herein.

In still other aspects, the electronic communication network is physically altered and transformed by utilizing the approaches described herein. For example, electronic switches, routers, or other electronic elements in one state are changed to different states. Electronic routing switches may be physically adjusted to route information or data in a certain way. In another example, the speed of data may be physically reduced or allowed to be increased for certain users across the network or within certain areas of the network by altering the operation, programming, setting parameters, and/or tuning various electronic elements. In yet other aspects, electronic elements within the network are set up or configured to "choke" (or not "choke") data. In still another example, electronic elements in the network may be configured to halt or prevent data or information movement when customer data limits are reached, or customer bills are unpaid.

In still other aspects, the decision logic may be dynamically changeable by a system administrator. For example, the system administrator may modify the logic, for example, by altering computer code that implements the logic. It will be appreciated that this modification results in a physical transformation of the decision logic.

Additionally, the decision logic may dynamically evolve as selections are made. In one particular example, the paths of users across the decision logic (or the parameters entered by users) may be monitored automatically. This information can be reported, analyzed, and used to change the decision logic or what is included in the offers. For instance, if no customers choose high cost plans or data rates, then an investigation may be performed to ascertain the reasons as to why customers are not choosing such plans or data rates. The decision logic may be altered to account for customer trends thereby increasing the chance that a customer will choose an offer and thereby increase the profitability of the system. For example, products with different features may be offered to entice customers to select these offers. It will be appreciated that these modifications to the decision logic are physical transformations, which can be made manually or automatically.

In other aspects, a billing system is automatically configured to accommodate offers accepted by customers. For instance, the billing system is informed that a particular customer has selected a particular plan, service, or product having particular costs and limits (e.g., data usage limits). Customer usage information may be monitored and tracked for billing purposes. For example, particular switches or other electronic network elements may be monitored. In examples, the system sends users messages (e.g., the customer is over limit) dynamically and in real-time based on the billing plan and customer usage.

In some of the approaches provided herein, two separate networks are deployed. One of the networks (e.g., a wireless network) is provisioned and used as part of the product or service, while the other network (e.g., the internet) is not provisioned but used for communication purposes between the electronic tool and a customer.

It will be appreciated that the approaches described herein often use a centralized control architecture. More specifically, customer parameters are received, the decision logic is executed, provisioning signals sent from, and billing accommodation instigated from, at, or by a central control center. This particular architecture allows central control and access by a plurality of users. This organization also allows charging for the execution of the decision logic. Because of the centralized architecture, the remote user or customer can also perform other tasks at the same time (in parallel) with the provisioning and billing activities leading to more efficient system operation.

Referring now to FIG. 1, one example of a system 100 that configures elements in an electronic communication network is described. The system 100 includes a first electronic communication network 102, a second electronic communication network 104, a user electronic device 106, and an electronic tool 108.

The first electronic communication network 102 and the second electronic communication network 104 are any type of electronic communication networks such as the internet, wireless networks, wide area networks, local area networks, cellular networks, or combinations of these or other networks. In one example, the first electronic communication network comprises the internet and the second electronic communication network is a wireless communication network. Other examples of networks are possible.

The second electronic communication network 104 includes various electronic elements 115 that route, track, monitor, transmit, and/or receive electronic communications, messages, and/or data. For example, the electronic elements 115 may include switches, routers, gateways, control circuits, memory storage devices, transmitters, receivers, and/or other types of electronic devices. Each of these elements 115 (or combinations of the elements 115) may be configurable, adjustable, and/or programmable. In aspects, an electronic control signal is applied to these elements 115 that causes a particular one of the elements 115 to perform a function. For example, one of the electronic elements 115 (or elements) may be configured to allow a user to utilize a certain data speed for an electronic device on the network. In another example, one of the electronic elements 115 (or elements) is configured to halt data usage for a user with an electronic device operating in the network. It will be appreciated that the configuration process may change the state of one of the electronic elements 115. In one particular example, an electronic switch may be moved from a first position to a second position. Other examples are possible.

The first user electronic device 106 includes an electronic display and is operated by a first user (user 1 or customer). The first user electronic device 106 is coupled to the first electronic communication network 102 and the second electronic communication network 104. A second user electronic device 107 includes an electronic display and is operated by a second user (user 2). The second user electronic device 107 is coupled to the second electronic communication network 104. The first user electronic device 106 includes a first application programming interface (API) 111 and the second user electronic device 107 includes a second API 113. The APIs 111 and 113 allow the first user electronic device 106 and the second user electronic device 107 to communicate with the networks. The user electronics devices 106 and 107 may be smartphones, laptop computers, tablet computers, or personal computers. Other examples of electronic devices are possible.

The electronic tool 108 is deployed or disposed at a central processing center 110 and includes a transceiver circuit 120, a database 122, and a control circuit 124. The electronic tool 108 is coupled to the first electronic communication network 102 and the second electronic communication network 104. The electronic tool 108 may be housed in a single physical housing. The tool 108 may be, for example, deployed as a portable electronics device or at a personal computer to mention two examples.

The transceiver circuit 120 receives marketing data 130 and the marketing data 130 is stored in the database 122. In examples, the marketing data 130 comprises pictures, videos, text, and instructions as to picture placement. The data may be stored in any appropriate electronic, video, image, or data format. Other examples of data are possible.

The transceiver circuit 120 is any type of electronic circuit that can transmit and receive information. The transceiver circuit 120 may include buffers, storage, transmitters, and receivers and may be implemented as any combination of computer software or electronic hardware.

The control circuit 124 is configured to execute decision logic 132, and execution of the decision logic 132 is effective to construct an appropriate product or service offer 134 for the customer based upon parameters entered by the customer at the first user electronic device 106. The parameters are received from the customer (user 1) at the first user electronic device 106 at the transceiver circuit 120 utilizing the first electronic communication network 102. In other aspects, the decision logic 132 includes multiple execution paths determined by the parameters entered.

In aspects, a customer first selects one general offer (from multiple general offers), but once this general offer is selected, the customer then selects from parameters selected from options sets to fully populate or define the offer. The general offer selected acts as a beginning or entry point into the decision logic, which, when executed allows the offer to be fully constructed or defined.

It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 124 may be configured (for example, by using corresponding programming stored in a memory as will be well understood by those skilled in the art) to carry out one or more of the steps, actions, and/or functions described herein.

In aspects, the decision logic 132 comprises computer instructions, code, or hardware (or combinations of these or other physical elements) that can be dynamically changed. For example, a system administrator may modify the logic by altering the computer code that implements the logic. In another example, the control circuit 124 may monitor operation or execution of the decision logic 132 and then automatically modify the logic 132. It will be appreciated that all of these modifications result in physical transformations of the decision logic 132.

Additionally, the decision logic 132 may dynamically change and evolve as selections are made by various customers. In one particular example, the paths of users across the decision logic 132 (or the parameters entered by users) may be monitored automatically by hardware and/or software at the tool 108 (e.g., the control circuit 124). This information can be reported, analyzed, and used to change the decision logic 132 or what is included in the offers, for example, by the control circuit 124. For instance, if few or no customers choose high cost plans, then an investigation may be performed to ascertain the reasons as to why customers are not choosing such plans. If few or no customers choose low data speed plans, the decision logic may be altered to account for this trend (e.g., omitting the option or decreasing the cost of the plan). Altering the decision logic may, in examples, alter the option sets presented to customers, the sequence of how these sets are presented, and specific details or features of these option sets.

In examples, the parameters entered by a customer or user (as the decision logic 132 is executed) include a data rate or a cost of the product offer 134. Other examples of parameters are possible. In further examples, the parameters entered by a customer or user include a data rate or a cost of the product offer. Other examples of parameters are possible.

Execution of the decision logic 132 in paths selected by parameters entered by the customer results in the full definition, construction, or creation of the offer 134. In aspects, the offer 134 is specific, tailored, or customized to a particular customer. The offer 134 that is created by the decision logic 132 incorporates at least some of the marketing data 130 and comprises an electronic visualization of one or more products or services for sale to the customer. The visualizations may be arranged to include these elements as well as price information, details concerning the offer, and a mechanism (a button on the screen) that (when touched or selected by the customer) indicates that the customer has accepted the offer.

The offer 134 created by the decision logic 132 is transmitted by the transceiver circuit 120 across the first electronic communication network 102 and rendered on the screen of the first user electronic device 106 for viewing by the customer. The customer indicates an acceptance of the product or service offer at the first user electronic device 106. The acceptance is transmitted via the first electronic communication network 102 to the transceiver circuit 120.

The transceiver circuit 120 receives the acceptance and the control circuit 124 responsively creates one or more electronic signals that are effective in provisioning one or more electronic elements 115 in the second electronic communication network 104 to implement the product or service offer 134. The control circuit 124 transmits a message to an electronic billing system 140 via the transceiver circuit 120 to accommodate the product or service offer.

Billing provisioning elements 142 are used to configure the billing system. For example, the billing system 140 may track usage, receive usage information (from subscribers), and perform other information and the elements 142 are used to accomplish these functions. The electronic billing system 140 is arranged to accommodate offers that have been accepted by customers. Accommodation may include physically altering the operation, performance, and/or function of the billing provision elements 142.

Incorporation of the marketing information into the appropriate product or service offer 134, the provisioning of the second electronic communication network 104, and the accommodation of billing information associated with the appropriate product or service offer 134 are performed automatically and seamlessly with the single electronic tool 108 without the use of other tools or processes.

Figure 2:
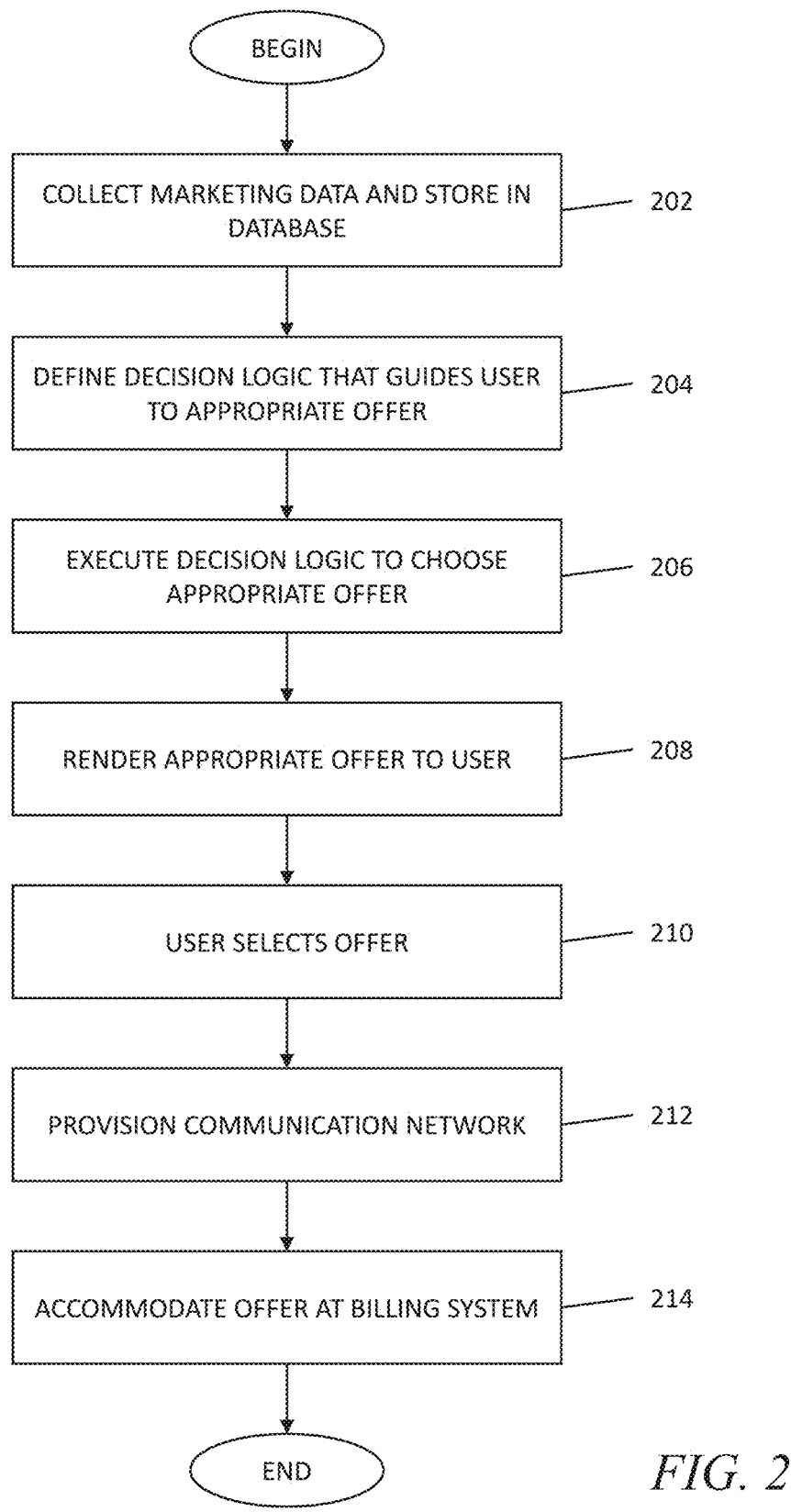
FIG. 2 comprises a flowchart as configured in accordance with various embodiments of these teachings.

Referring now to FIG. 2, an approach that configures elements in an electronic communication network is described. At step 202, marketing data is collected at a single electronic tool and stored in a database at the electronic tool. At step 204, decision logic is defined at the electronic tool. The decision logic allows a customer to obtain an appropriate product or service offer based upon parameters entered by the customer and utilized by the decision logic. In aspects, a customer selects one general offer (from multiple general offers), but once this general offer is selected, the customer then selects from the options sets (based on execution of decision logic) to fully populate or define the offer.

Once defined and at step 206, the decision logic is executed at the electronic tool to obtain or fully define the appropriate product or service offer. The offer incorporates at least some of the marketing data and comprises electronic visualizations of one or more products or services for sale to a customer and to be rendered on an electronic display.

At step 208 and at the electronic display, appropriate product or service offer that has been determined by executing the decision logic is rendered. At step 210, the customer accepts the offer (e.g., the user submits an order with the offer), generating an acceptance. The acceptance of the product or service offer by the customer is received at the tool and at step 212 the tool responsively provisions one or more electronic elements in an electronic communication network to implement the product or service offer. At step 214, the tool also transmits a message to an electronic billing system to accommodate the product or service offer.

The incorporation of the marketing information into the appropriate product or service offer, the provisioning of the network, and the accommodation of billing information associated with the appropriate product or service offer are performed automatically and seamlessly with the single electronic tool without the use of other tools or processes.

Figure 3:
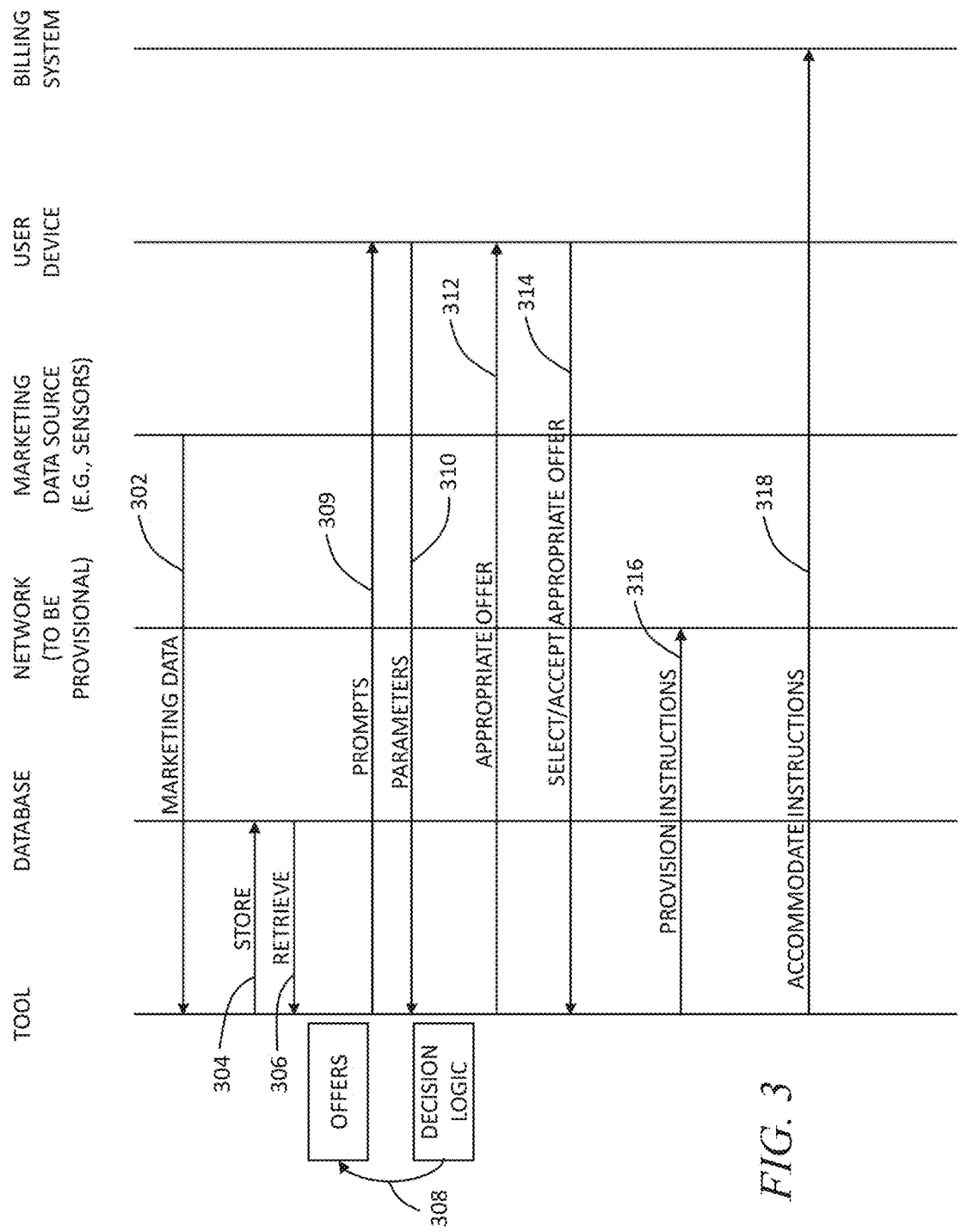
FIG. 3 comprises a flow diagram as configured in accordance with various embodiments of these teachings.

Referring now to FIG. 3, one example of an approach that provisions an electronic communication network is described. At step 302, marketing data is sent from a marketing data source (e.g., sensors, a marketing database) to an electronic tool. The marketing data may include photos, video, or text. The marketing data may be in any electronic format. At step 304, the marketing data is stored in a database or electronic memory device. Subsequently, at step 306, the marketing data is retrieved from the database when the tool determines it will construct offers.

At step 308, decision logic (at the tool) is executed to construct an offer. In aspects, the decision logic may be computer-executable code that has various execution paths. The execution paths are determined by parameters 310 entered by the user at an electronic device (e.g., a smartphone, tablet, laptop or personal computer). The user may be issued prompts 309 to enter the requested parameters 310. The requested parameters may include preferences of the user (e.g., preferences as to data rate, data speed, or cost to mention a few examples).

At step 312, the appropriate offer is sent or rendered to the user at the user electronic device. The user considers the offer and at step 314 accepts or selects the offer. For example, the user may use a computer mouse or their fingers to select or actuate a virtual or visual button or area on a screen of the user electronic device.

At step 316, the tool sends electronic control signals that are applied to electronic elements in a network to be provisioned. The electronic elements may be routers, switches, gateways, or other types of elements present in an electronic network that control, route, monitor, or otherwise affect information or communications as the information or communications traverse the network. The control signals, in aspects, alter the states of the elements or change information flow, or aspects of information flow, in the network. For example, electronic switches may be changed to different positions or the speed of data reduced (or increased) for particular users at particular electronic elements in the network.

At step 318, the tool sends electronic instructions to a billing system so that the billing system can accommodate the offer that was selected by the user. Accommodation may include informing the billing system of information concerning the user or customer (e.g., a user identifier, phone number, IP address) and the details of the offer (e.g., billing rate, time period covered by the offer, data rate, data speed, to mention a few examples). The billing system may automatically take electronic actions that implement or otherwise accommodate a billing arrangement. For example, the billing system may send electronic control signals to the network that cause electronic elements within the network to monitor the usage of the network by the user or customer. The information gathered may be transmitted to the billing system where the information is further processed to generate a billing invoice for the customer.

Figure 4:
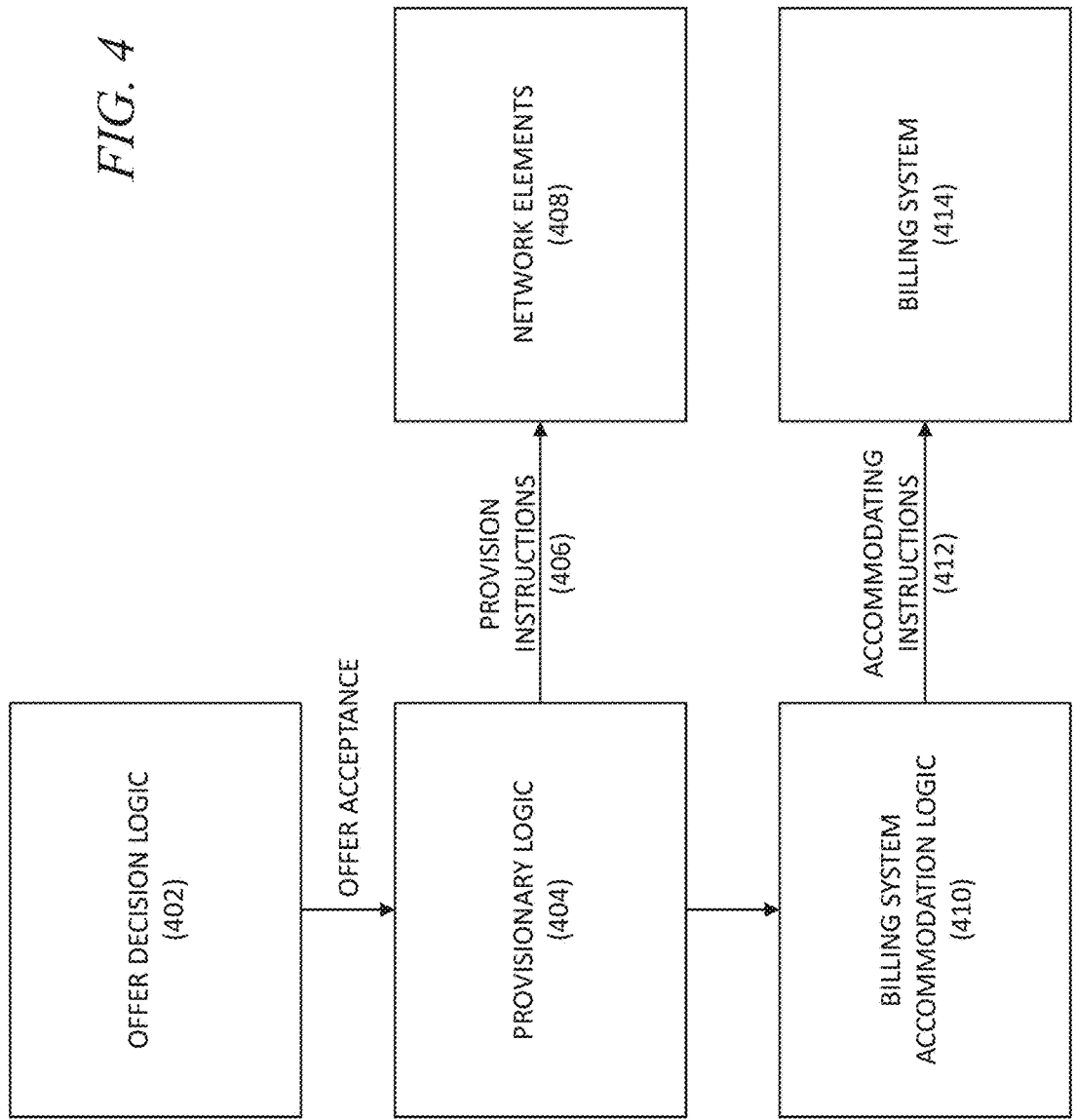
FIG. 4 comprises a flowchart as configured in accordance with various embodiments of these teachings.

Referring now to FIG. 4, one example of an approach for network provisioning is described. The execution of offer decision logic 402 determines an offer. The decision logic may be a computer-executable code that has various execution paths. The execution paths taken to form an offer are determined by information entered by the user at an electronic device (e.g., a smartphone, tablet, laptop or personal computer). The user may be issued prompts to enter the requested information. The requested information may include preferences of the user (e.g., preferences as to data rate, data speed, or cost to mention a few examples).

The decision logic 402 is dynamically changeable. For example, the decision logic 402 may be updated by a system supervisor. In addition, execution of the decision logic may be monitored to ascertain customer behavior. Based upon the results of the monitoring the decision logic may be updated in real-time to reflect customer behavior, selections, or the information entered. For example, when customers are detected to prefer low cost offers, then the decision logic can be modified to provide these low cost offers. When the vast majority of customers are selecting high-speed data rates, then the decision logic can be updated to create offers having these aspects or include marketing information that includes these aspects. The update or modifications to the decision logic 402 may be performed manually or automatically (e.g., by another computer program).

In aspects, a customer selects one general offer (from multiple general offers), but once this general offer is selected, the customer then selects from the options sets (based on execution of decision logic) to fully populate or define the offer. The customer then selects or accepts the specific offer created for the customer. As a result, provisioning logic 404 is executed. The provisioning logic 404 may create electronic control signals or instructions 406 that implement the offer. The electronic control signals 406 are applied to electronic elements 408 in a network to be provisioned. The electronic elements 408 may be routers, switches, gateways, or other types of elements present in an electronic network that control, route, monitor, or otherwise affect information or communications as the information or communications traverse the network. The control signals 406, in aspects, alter the states of the elements 408 to change information flow or aspects of information flow in the network.

A billing system accommodation logic 410 is then executed to accommodate the offer with the billing system. The billing system accommodation logic 410 may be deployed or disposed at the same location as the tool.

The billing system accommodation logic 410 sends electronic instructions 412 to a billing system so that the billing system 414 can accommodate the offer that was selected by the user. The instructions 412 may include informing the billing system of information concerning the user or customer (e.g., a user identifier, phone number, IP address) and the details of the offer (e.g., billing rate, time period covered by the offer, data rate, data speed, to mention a few examples). The billing system 414 may take actions that implement a billing arrangement. For example, the billing system may send electronic control signals to the network that cause electronic elements within the network to monitor the usage of the network by the user or customer. The information gathered may be transmitted to the billing system where the information is further processed to generate a billing invoice for the customer.

Figure 5:
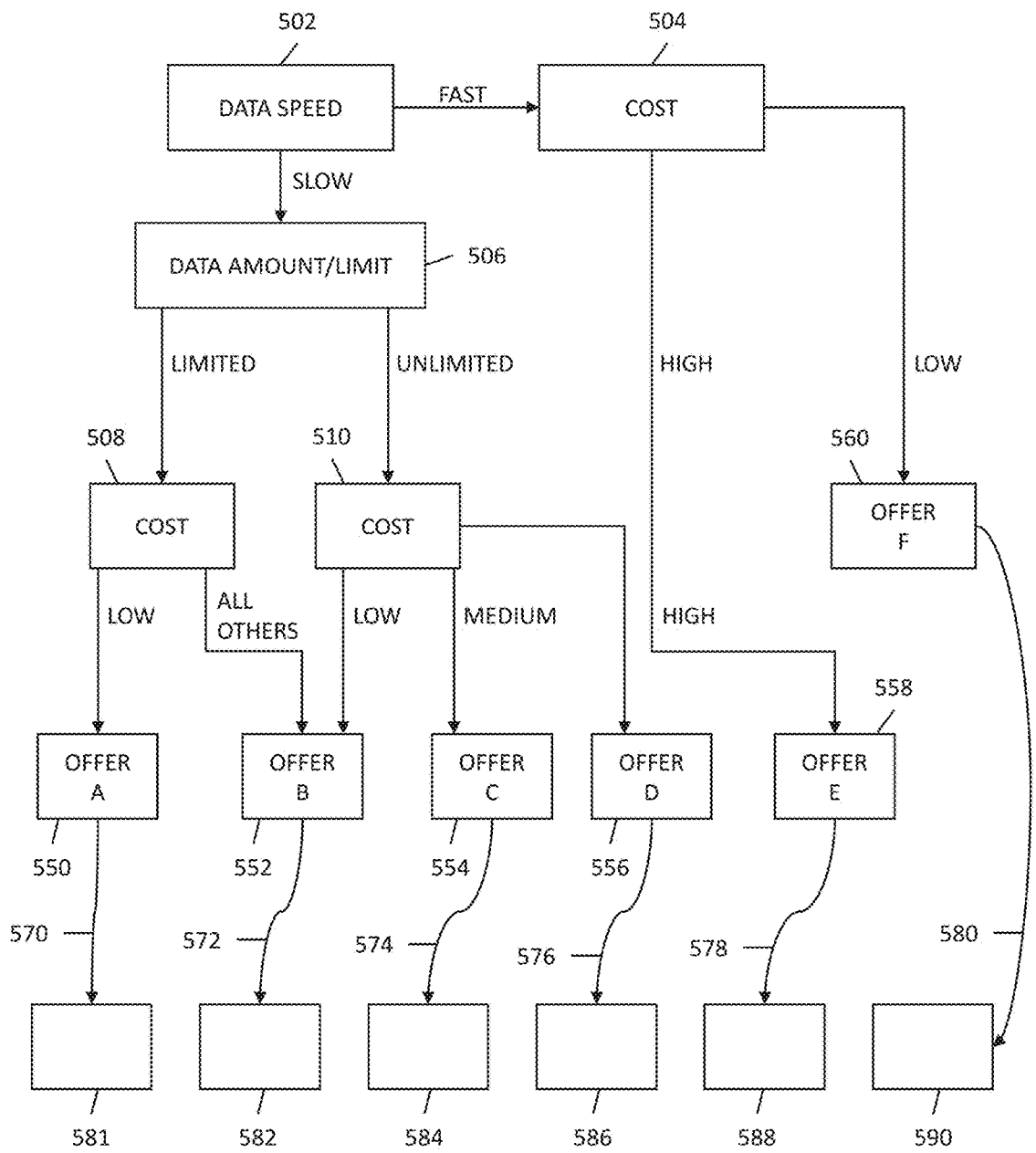
FIG. 5 comprises a flowchart as configured in accordance with various embodiments of these teachings.

Referring now to FIG. 5, one example of decision logic (e.g., the decision logic 132 described in FIG. 1) is described. The example of FIG. 5 assumes that a customer has selected a general offer that is now to be further defined and customized for a particular customer. The example of FIG. 5 also assumes that a customer is prompted to enter certain information, and the customer's responses or entered information generate a specific executable path through the electronic logic that selects an appropriate offer (based upon the responses). It will be appreciated that the example of FIG. 5 is one example of decision logic and that other examples of decision logic are possible.

At step 502, the customer is asked for their preferred data speed (e.g., a first option set). If they select a fast data speed, execution continues at step 504 where the customer is prompted for their preferred price. If the customer selects a high price, then the offer selected is offer E (558), otherwise (the user prefers a low price), the offer selected is offer F (560).

When the user selects slow data speed at step 502, the user is next prompted at step 506 for their preferred data amount or data limit (e.g., another option set). If the user selects a limited data amount at step 506, step 508 is executed. If the user selects an unlimited data amount at step 506, step 510 is executed.

At step 508, the customer is prompted as to their preferred cost option (e.g., another option set). If the user selects a low cost, then offer A (550) is selected. For all other customer choices, offer B (552) is selected.

At step 510, the customer is prompted as to their preferred cost. If the user selects a low cost, then offer B (552) is selected. If the user selects a medium cost, then offer C (554) is selected. If the user selects a high cost, then offer D (556) is selected.

It will be understood that the decision logic of FIG. 5 may be at least partially implemented as computer instructions (and accompanying data structure) that are executed on a computing device. As such, the decision logic can be easily and dynamically modified. For example, the offers A, B, C, D, E, and F can be changed (e.g., the offer A can be changed to offer X, where offer X is a newly created offer). It will also be understood that in this example only one unique appropriate offer was made to a customer. In other aspects, multiple offers may be made simultaneously to a customer and the customer may select one (or none) of these offers.

In another example, the offers A, B, C, D, E, and F are implemented as computer code or instructions, which can be dynamically changed. For instance, marketing material included in the offers can be dynamically changed. These elements can be implemented as a custom data structure where pointers 570, 572, 574, 576, 578, and 580 point from the offers A, B, C, D, E, and F to marketing materials 581, 582, 584, 586, 588, and 590 (where these material may be in electronic form and include, for instance, photos, video, or text) included in the data structure. The pointers 570, 572, 574, 576, 578, and 580 can be easily modified to point to different or newly created marketing material. It will be understood that this is one particular example of a dynamic data structure that can be dynamically changed in real-time, leading to more efficient computer operation.

It will be further understood that the decision logic of FIG. 5, in aspects, may implement and enforce predetermined rules. For example, selection of one option may entitle a user to be eligible to receive, obtain, or select another option.

Figure 6:
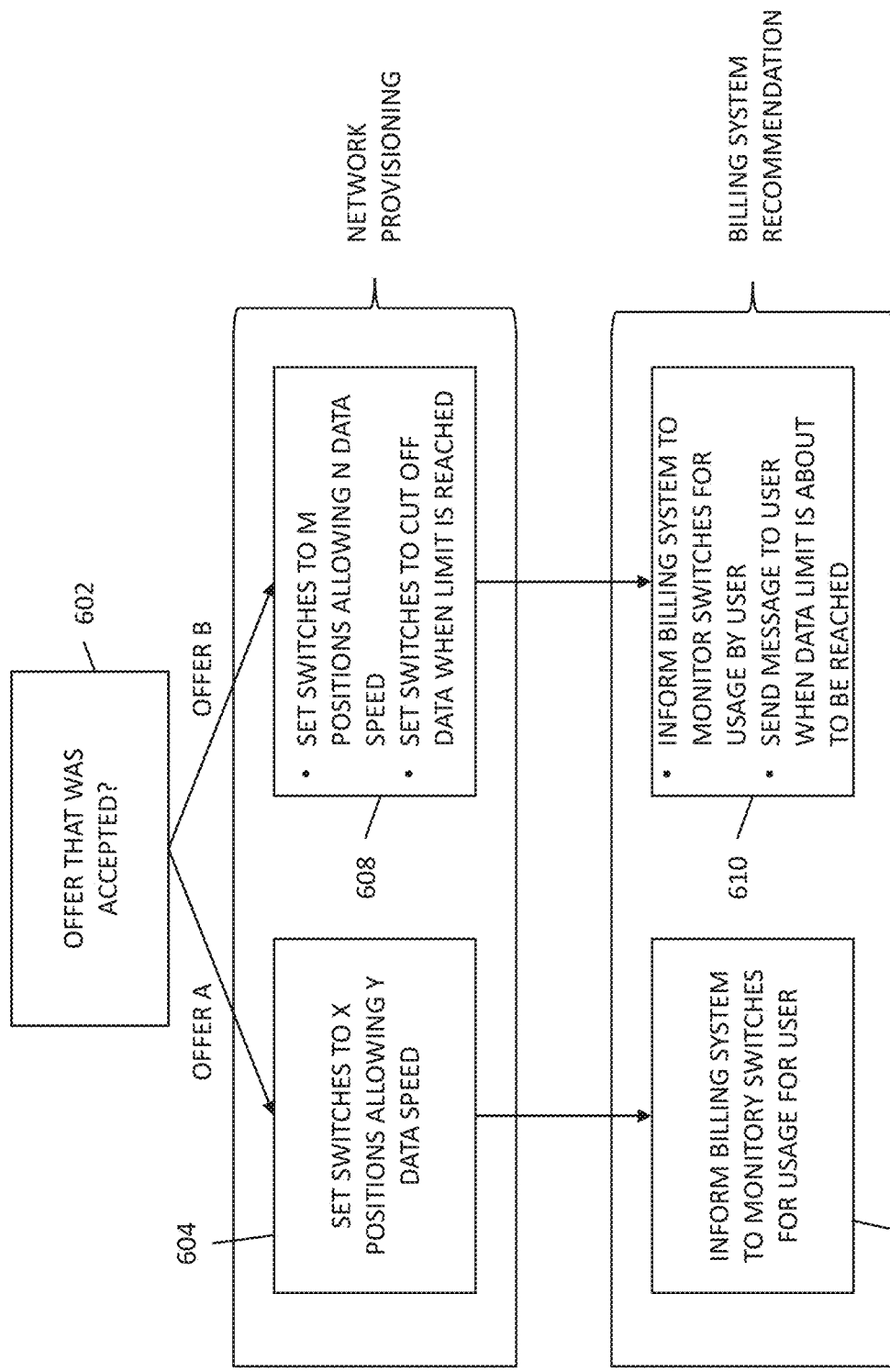
FIG. 6 comprises a flowchart as configured in accordance with various embodiments of these teachings.

Referring now to FIG. 6, one example of network provisioning logic and billing system accommodation logic is described (using the example of provisioning logic 404 and the billing system accommodation logic 410 described with respect to FIG. 4). In this example, only two offers are shown (offer A and offer B). At step 602, it is determined the offer that was accepted by the customer. If the customer has selected offer A, then at step 604, the network provisioning logic defines and sends control signals to the network to set switches to X positions and allow Y data speed. The control signals may be according to any appropriate format and may specify a destination electronic element (or elements) that are to be provisioned.

At step 606, the billing system accommodation logic is executed to inform the billing system of the customer information and to monitor electronic switches and other network elements for usage of the customer.

At step 608 and when offer B was accepted by the customer, network provisioning logic defines and sends signals to the network to set switches in M positions allowing N data speed. Switches are set to cut-off data to a user when a predetermined data amount is reached.

At step 610, the billing system accommodation logic is executed to inform the billing system to monitor electronic switches and other network elements for usage of the customer. Also, the billing system is sent instructions to inform the user when a data limit is about to be reached.

It will be appreciated that this is one example of provisioning offers and accommodating these offers with a billing system. Other examples are possible.

Figure 7:
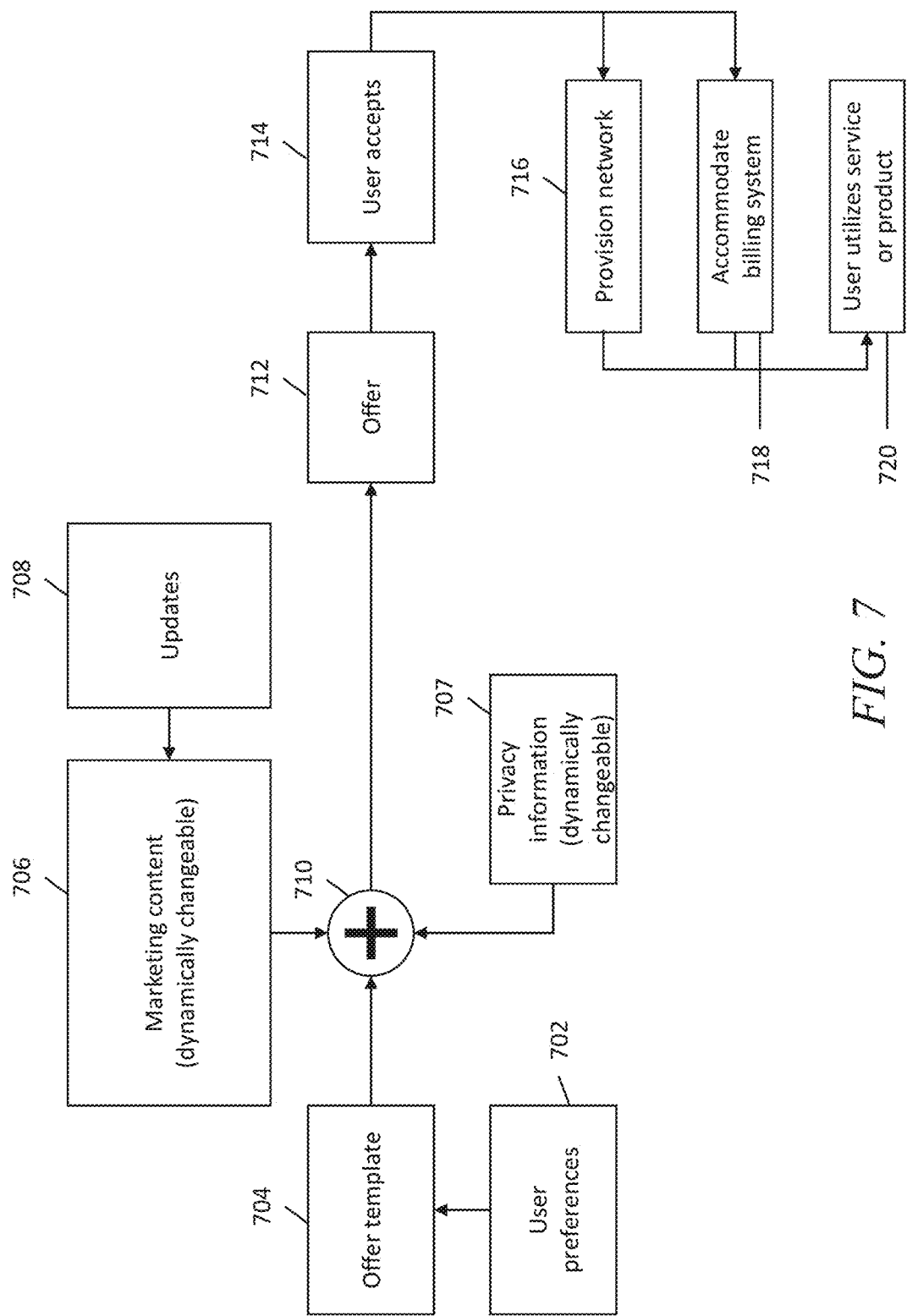
FIG. 7 comprises a flowchart as configured in accordance with various embodiments of these teachings.

Referring now to FIG. 7, one example of an approach for provisioning a network is described. Generally speaking, a customer selects one general offer (from multiple general offers), but once this general offer is selected, the customer then selects from the options sets (based on execution of decision logic) to fully populate or define the offer. In other words, the option sets fully customize a general offer to a specific offer for a specific customer. The example of FIG. 7 assumes a customer has already selected a general offer that now needs to be defined.

Customer or user preferences 702 are used by decision logic to create an offer that is visualized as an offer template 704. The offer template 704 is an electronic data structure or visualization structure that (when rendered) presents an offer visually to a customer as serves as a starting point for fully creating a visualization that can be rendered to a customer.

The template 704 includes positions or places where marketing content 706 can be included. The template 704 is a predetermined electronic structure where additional information (e.g., marketing content 706 or pricing (or other) information 707) can be entered.

The marketing content 706 may be videos, text, pictures, images, or other visualizations that are used to present offers. Updates 708 may represent new marketing material and/or changes to the existing marketing material. The updates 708 can be applied to the template 704 in real-time as these updates are received. Consequently, the most up-to-date marketing information is used in the offers.

Similarly, the pricing information (e.g., prices to be charged to the customer for an offer) may dynamically change over time and is included in the template 704. The pricing information 707 may be based upon customer-specific factors and these may also change over time. Consequently, the most up-to-date pricing information is used in the offers.

The pricing information 707 (and other offer details) may be determined by the execution of decision logic as described herein. In other words, execution of the decision logic results in the determination of pricing or other details concerning the offer.

The template 704 and marketing content 706 are electronically combined at step 710 to form an offer 712. The offer 712 is an electronic visualization that is rendered to the user. At step 714, the customer accepts or selects the offer.

At step 716, the network is provisioned according to the accepted offer. Electronic control signals or instructions are sent to electronic elements in the network to implement the offer. The electronic control signals then are applied to electronic elements. The electronic elements may be routers, switches, gateways, or other types of elements present in an electronic network that control, route, monitor, or otherwise affect information or communications as the information or communications traverse the network. The control signals, in aspects, alter the states of the elements to change information flow or aspects of information flow in the network.

At step 718, the billing system is instructed to accommodate the offer and the billing system executes steps to accommodate the offer. For example, the billing system may send electronic control signals to the network that cause electronic elements within the network to monitor the usage of the network by the user or customer. The information gathered may be transmitted to the billing system where the information is further processed to generate a billing invoice for the customer.

Steps 716 and 718 may be performed serially or in parallel. In aspects, execution of the steps 716 and 718 in parallel leads to faster and more efficient network operation since the completion of one of the steps is not required for execution of the other step.

At step 720, the customer utilizes the service or product selected by the offer. The billing system collects information concerning this usage and may create electronic or other billing invoices concerning this usage.

FIGS. 8-21 are example screens that can be rendered to different personnel (e.g., back office or system administrators or users, or customers) to implement the approaches described herein.

Figure 8:
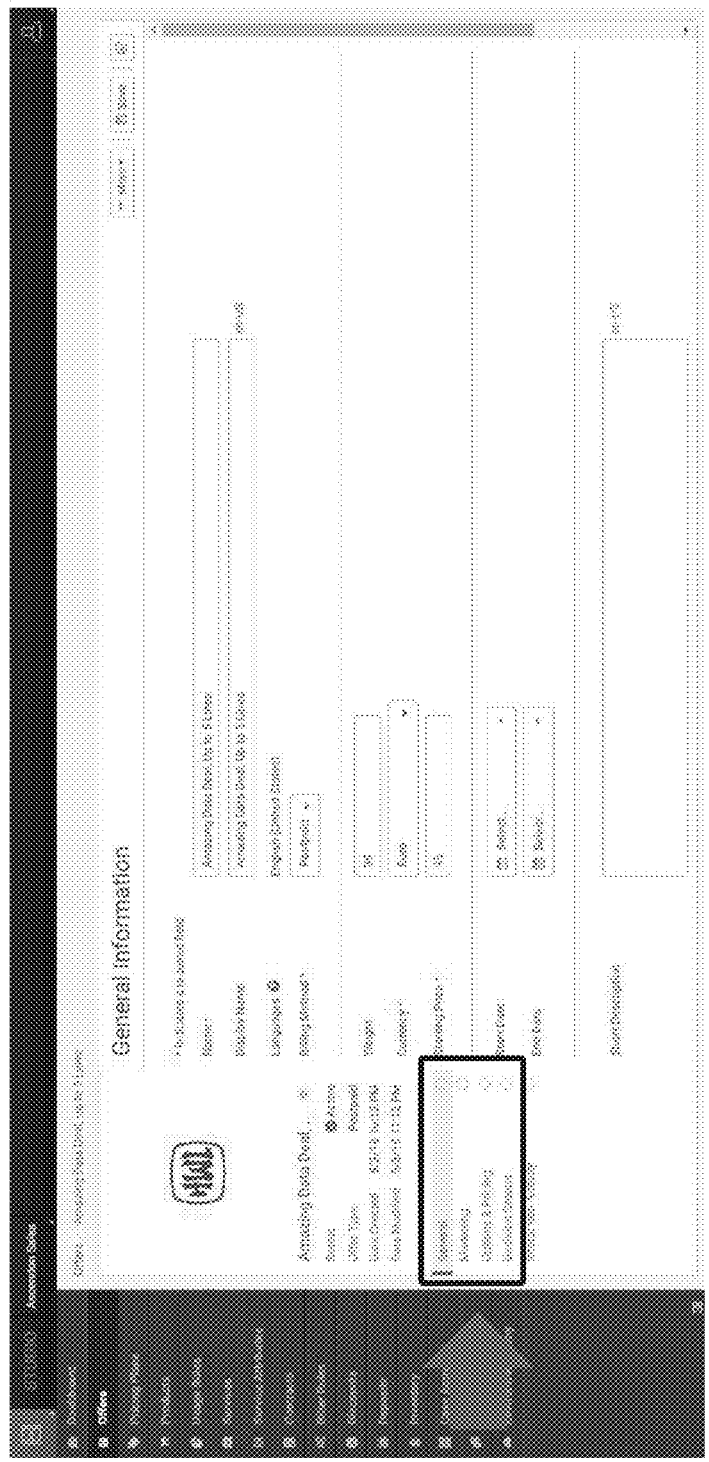
FIGS. 8-21 comprise diagrams as configured in accordance with various embodiments of these teachings.

FIG. 8 shows one screen where a back-office administrator can select between general, marketing, options and decisions, and decision groups.

Figure 9:
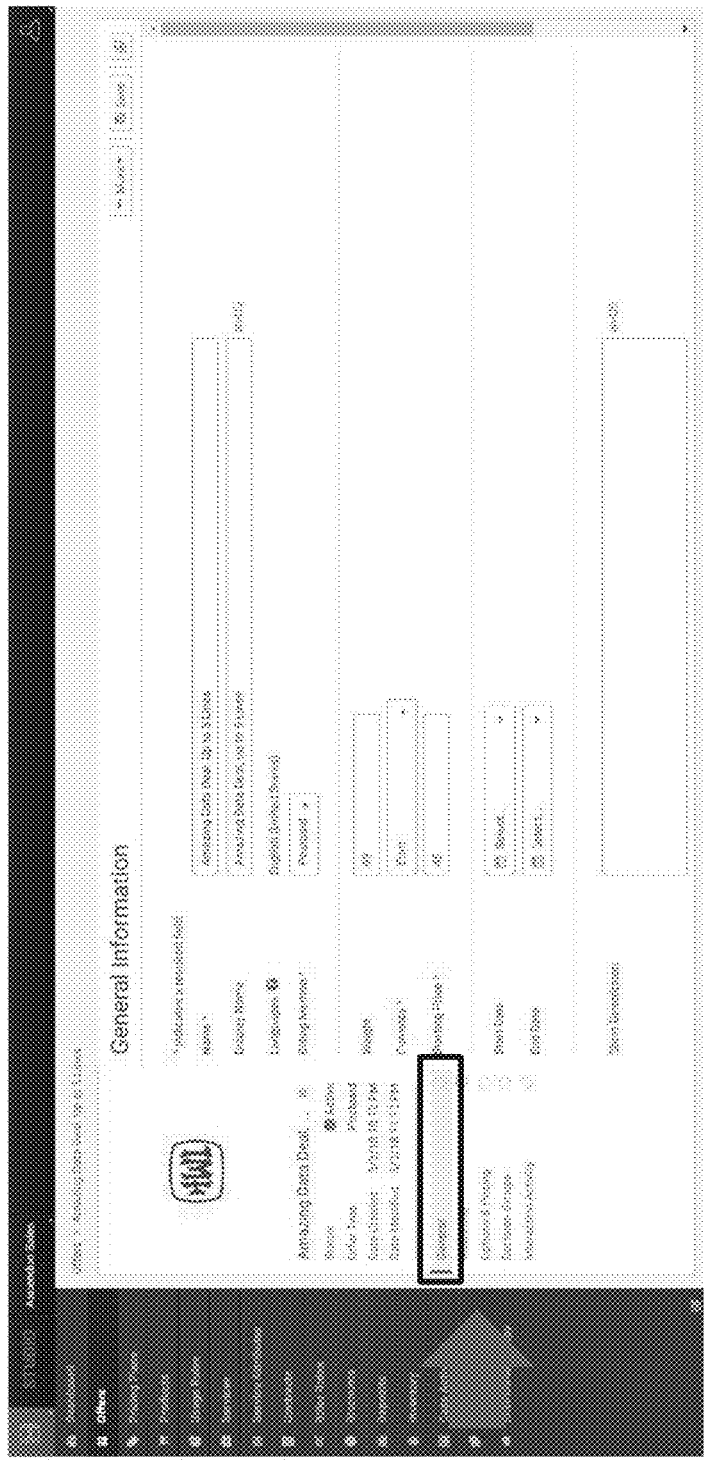

FIG. 9 shows that, first, on the general tab, the back-office administrator adds general information about the offer. For example, the name of the billing offer, the billing method, the weight (for sorting), currency, price, start and end dates, and short and/or long-term description. This information is used to market a general offer to a customer (e.g., may be the general offer referenced herein).

Figure 10:
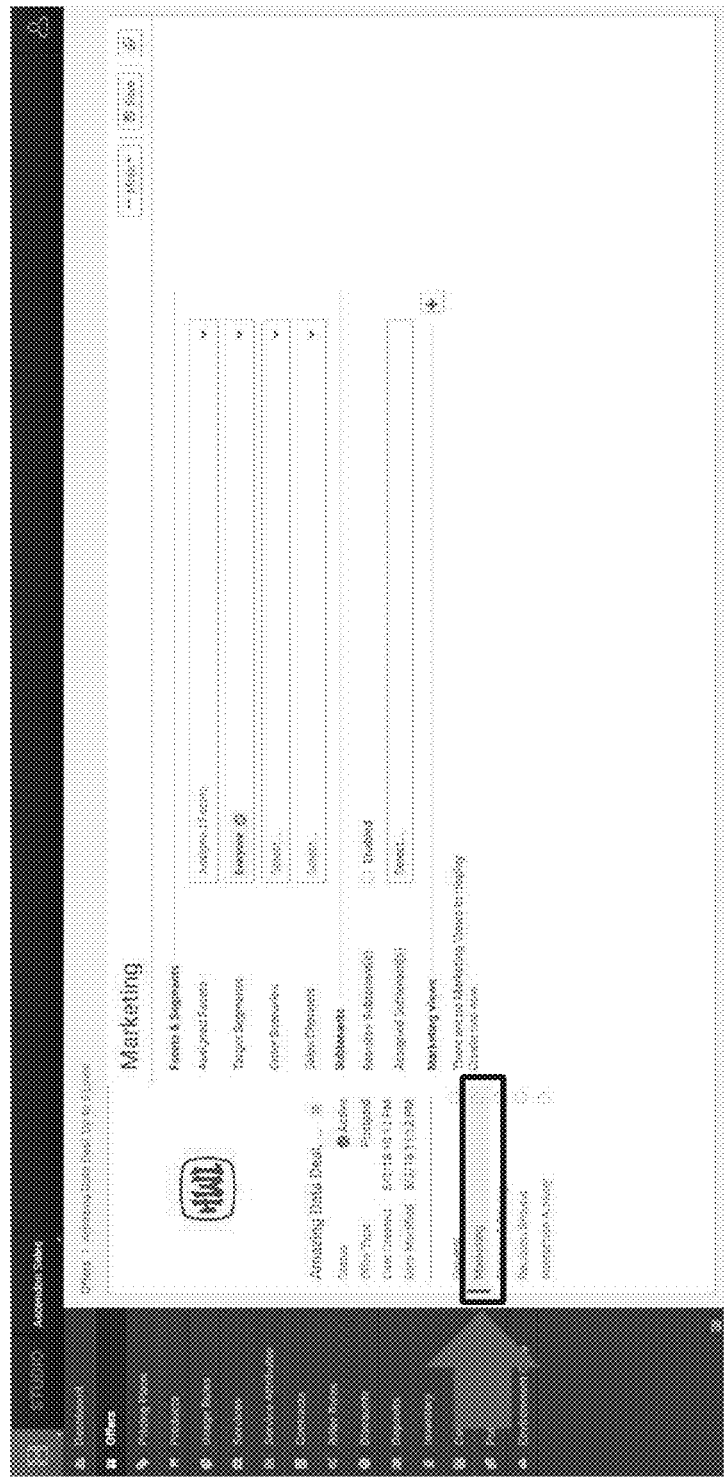
Figure 11:
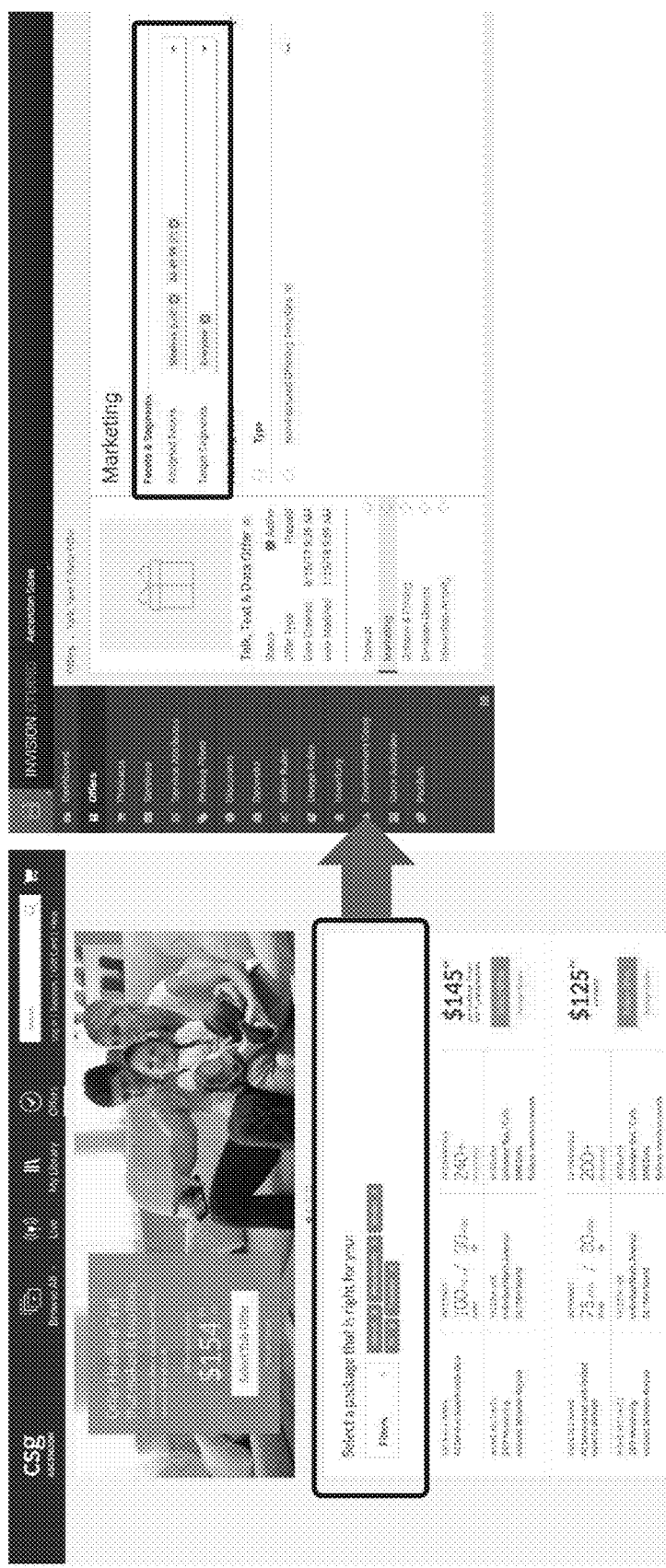
Figure 12:
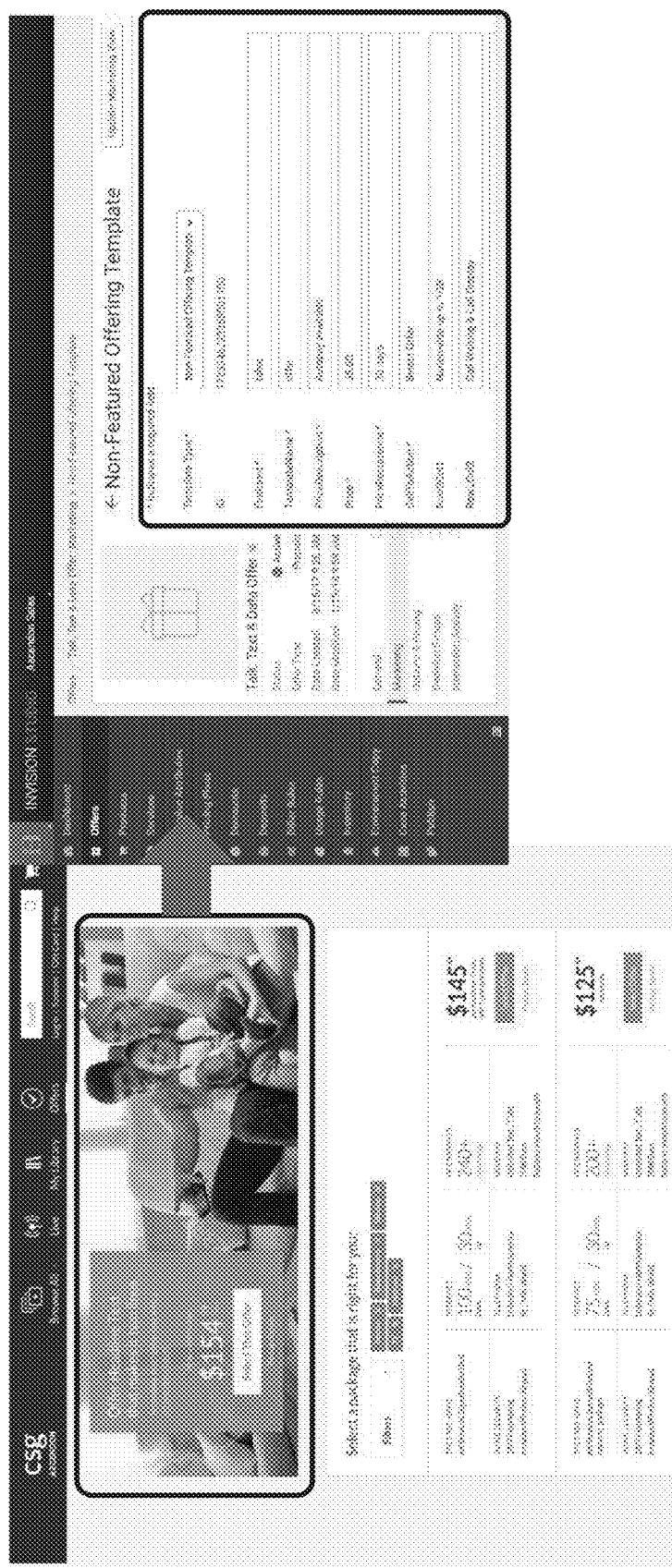

Second and as shown in FIGS. 10, 11, and 12, on the marketing tab, the back-office administrator adds more detailed marketing information, including search facets, customer segmentation, channel and order segmentation, and marketing templates that drive and create a front-end display (e.g., FIG. 11 and FIG. 12) seen by the customer.

Figure 13:
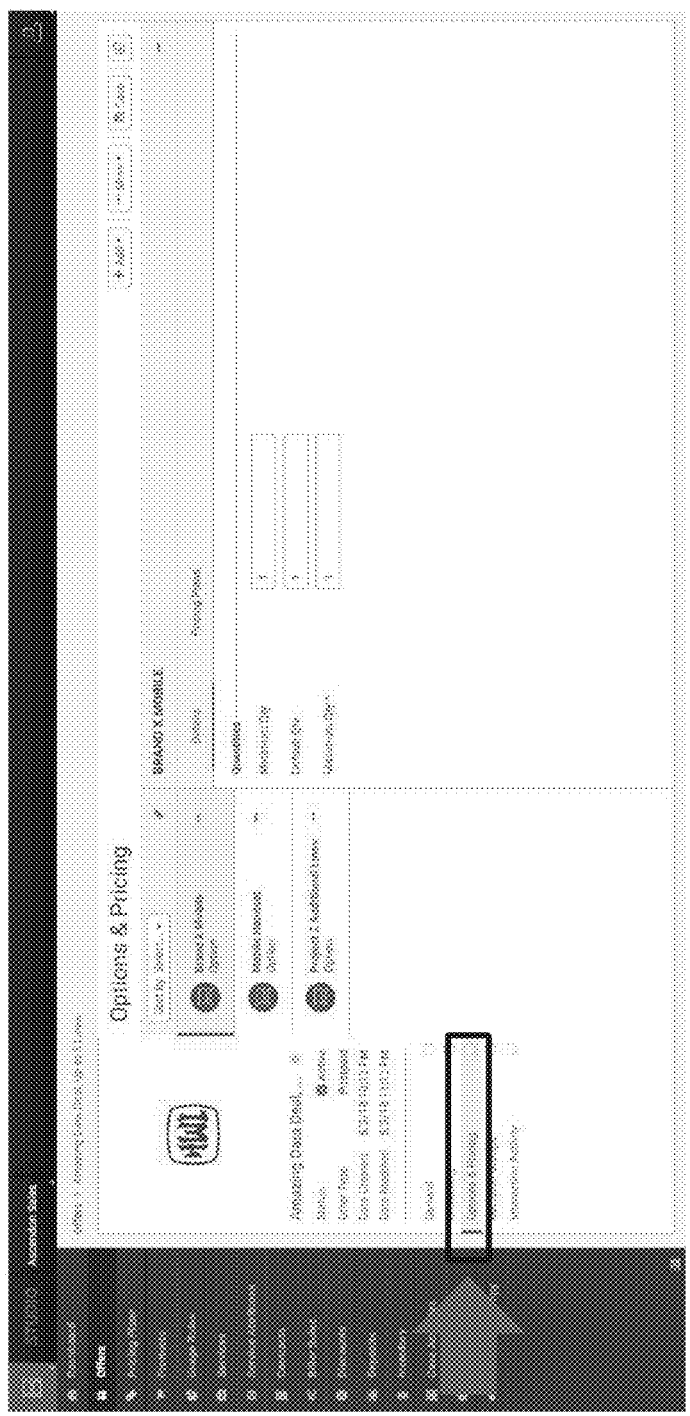
Figure 14:
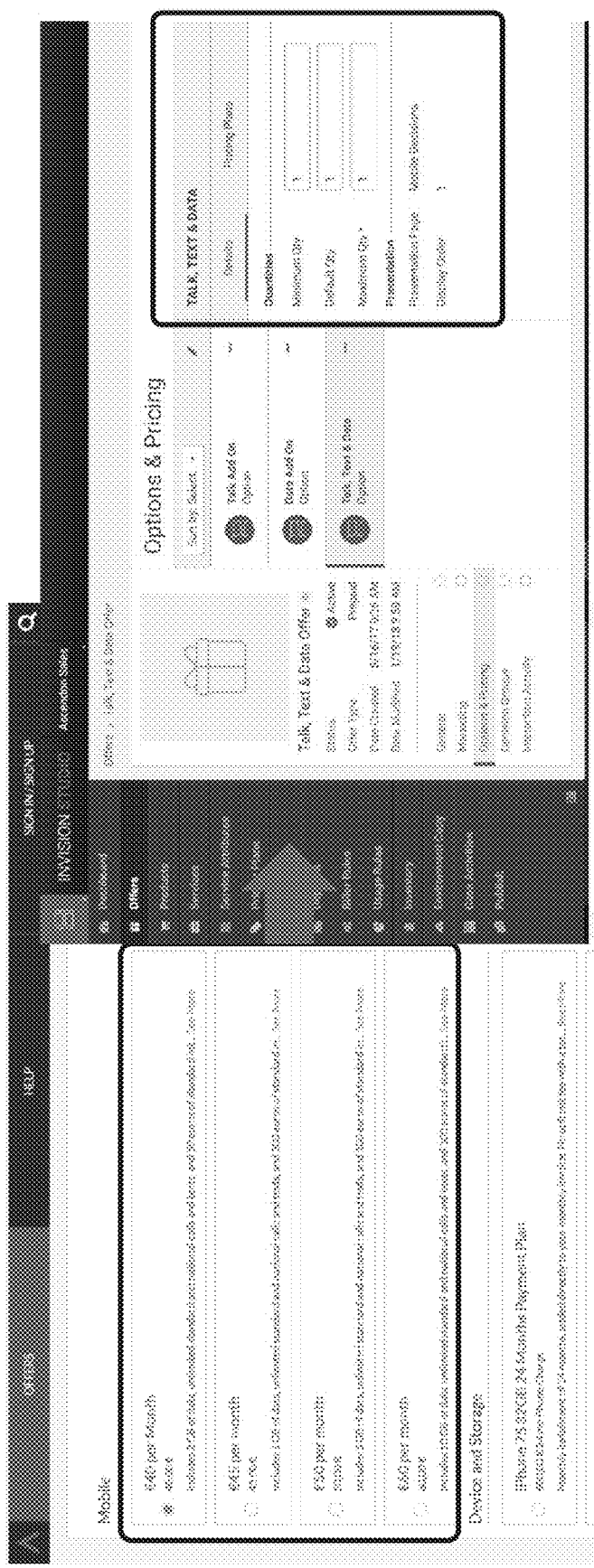
Figure 15:
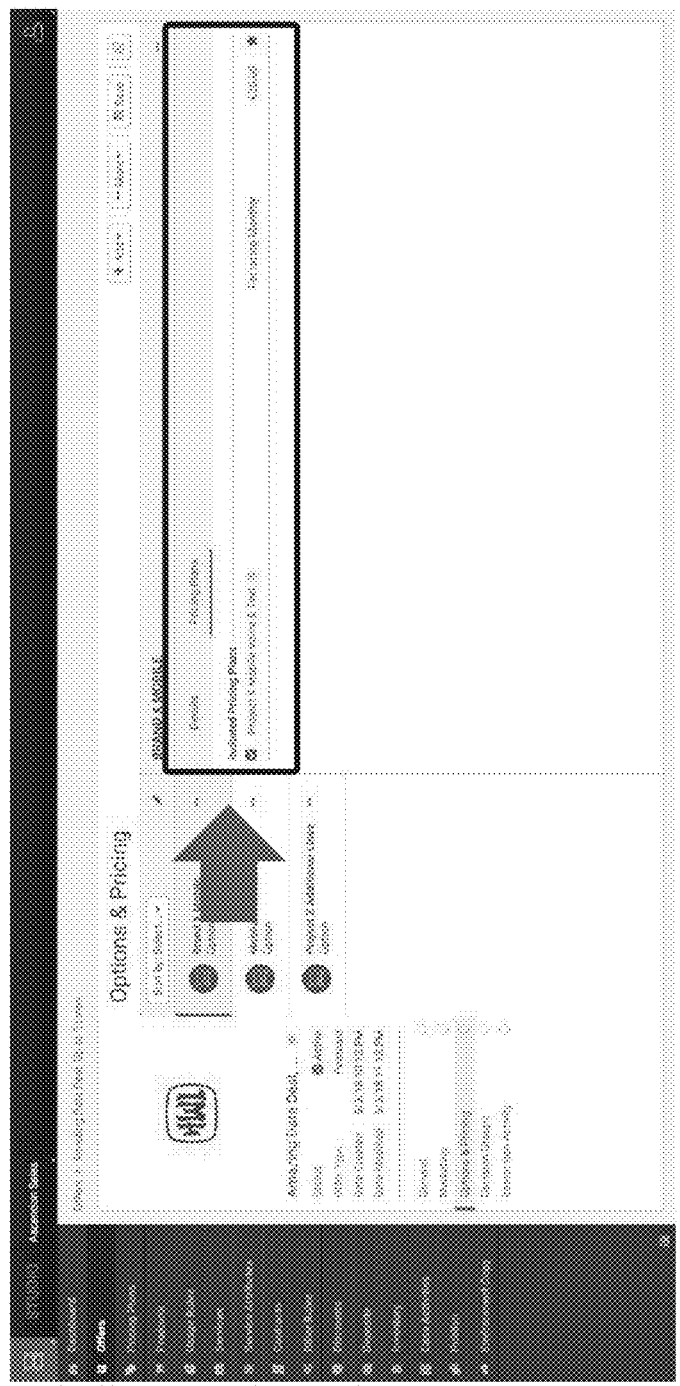
Figure 16:
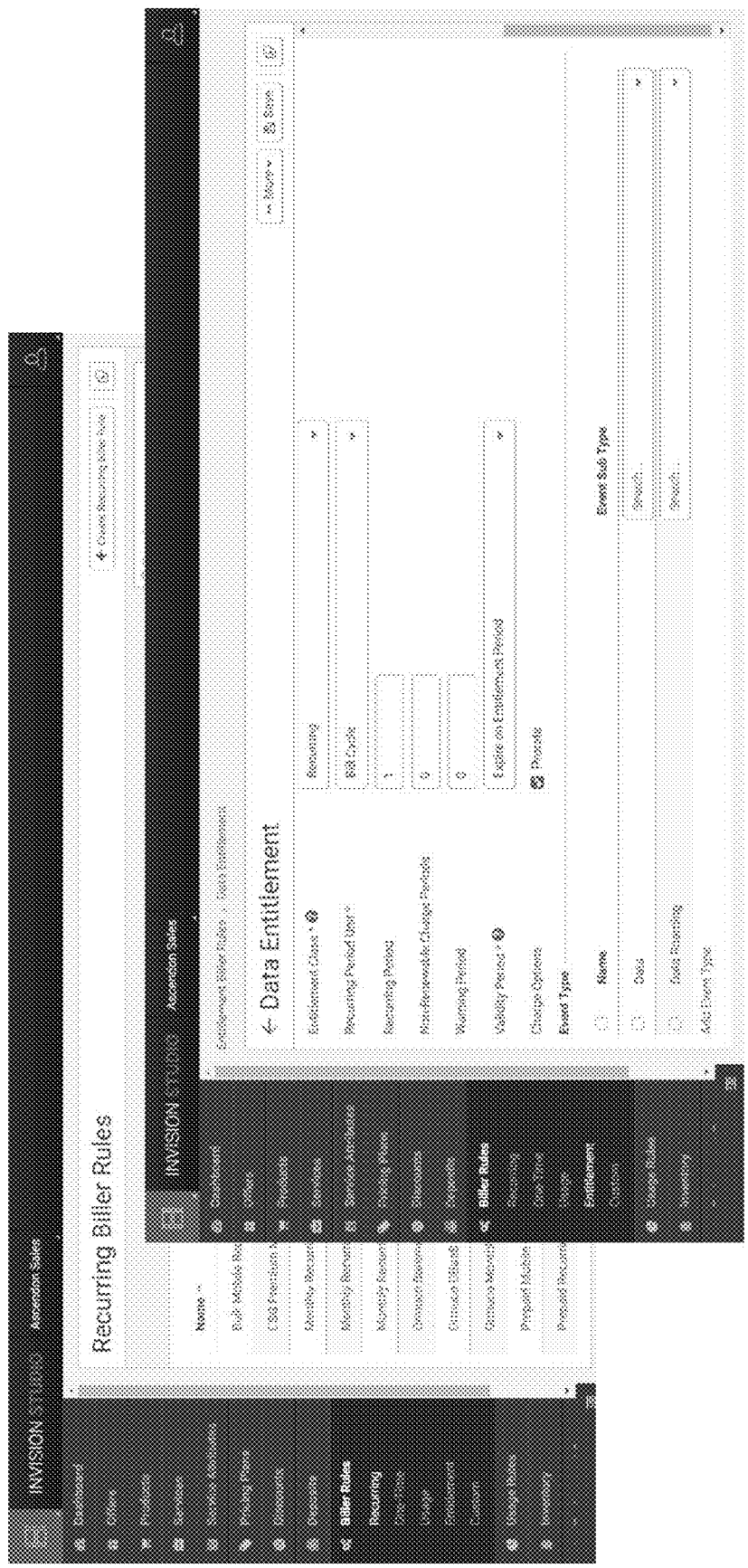
Figure 17:
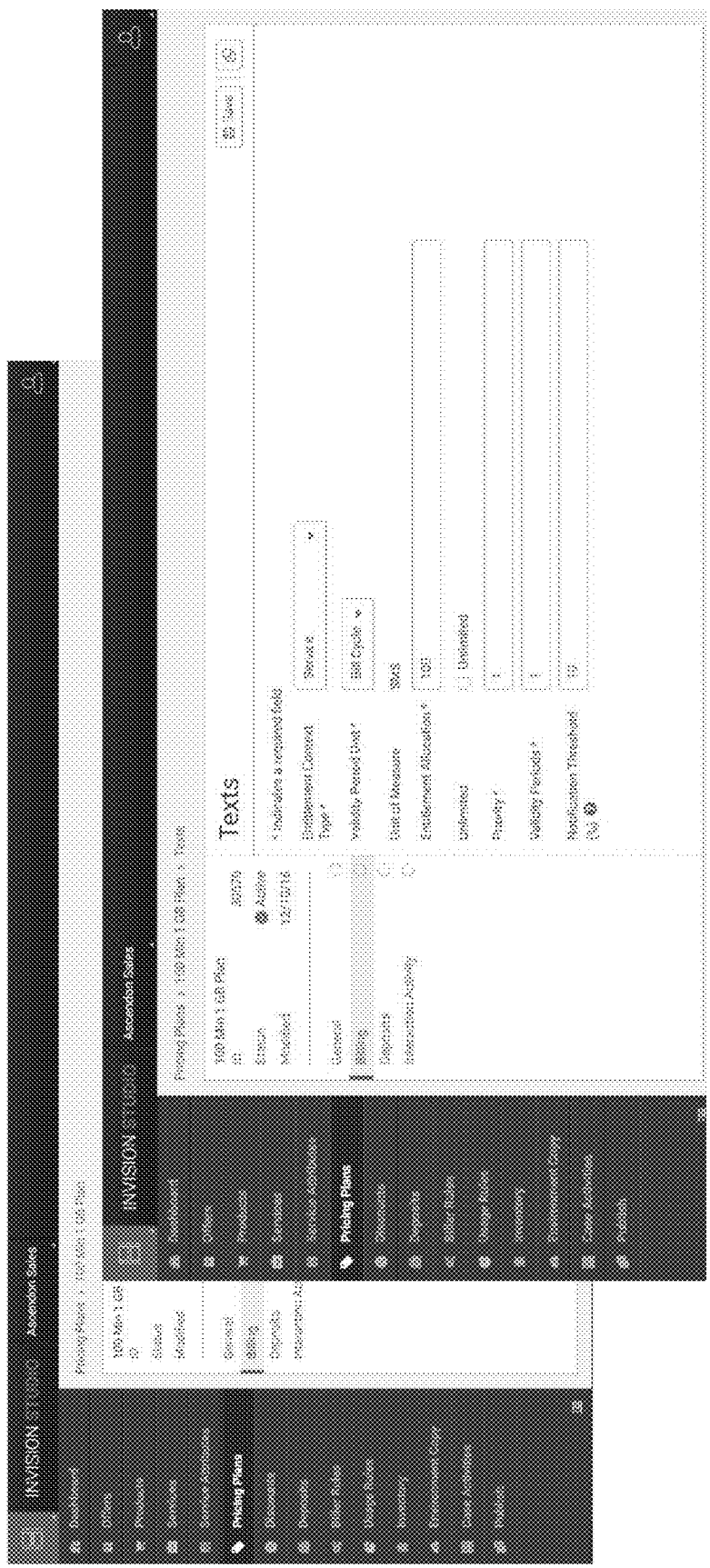
Figure 18:
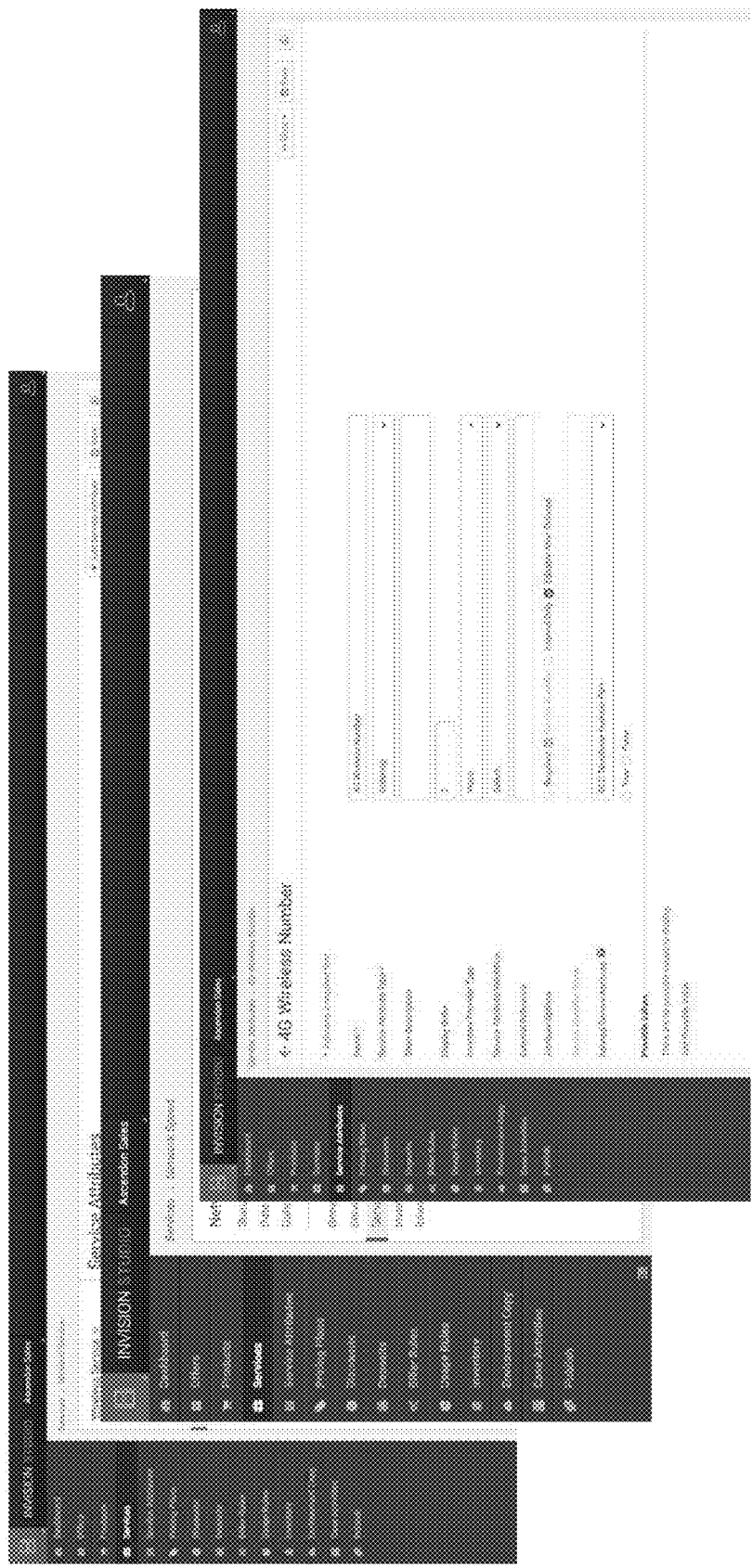
Figure 19:
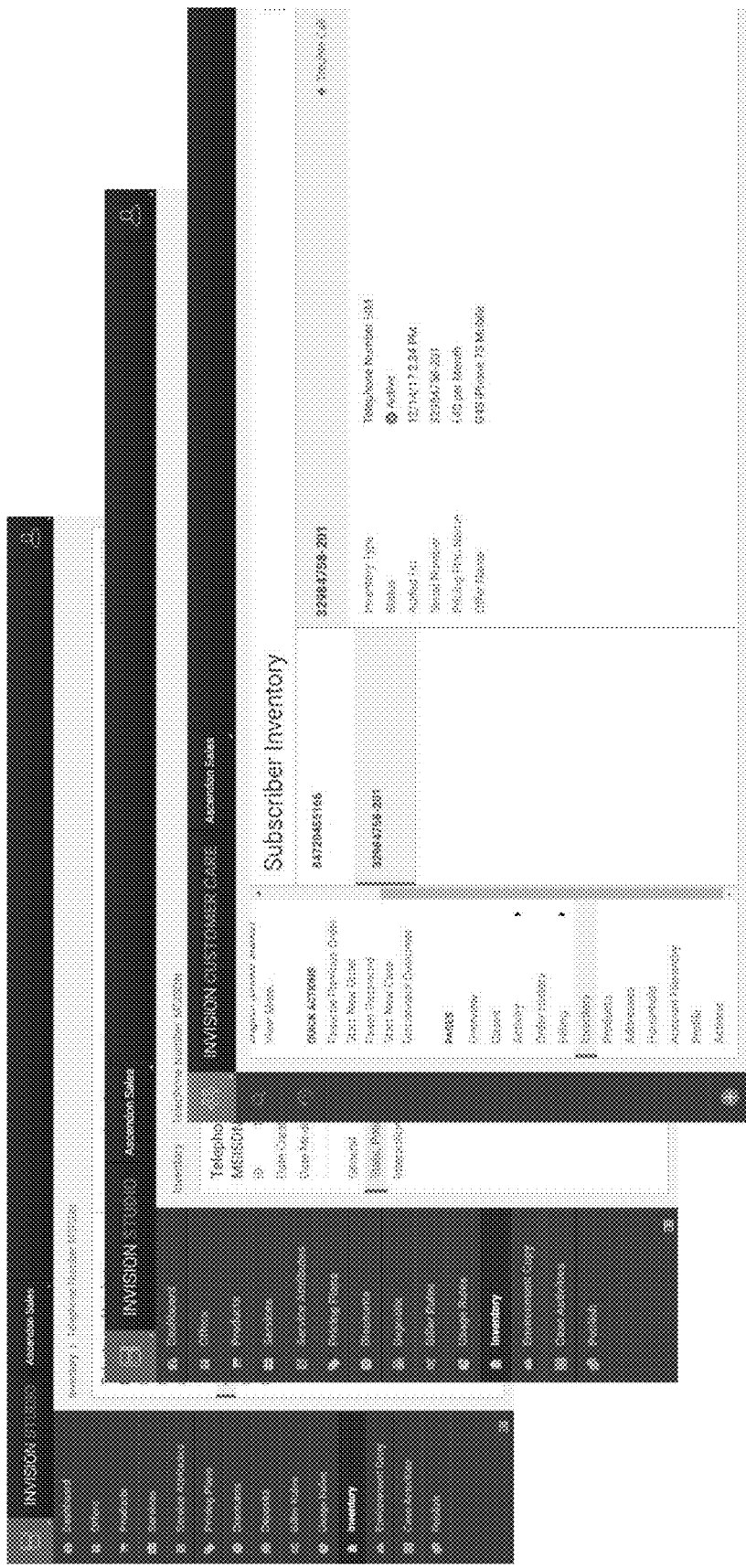

Next, as shown in FIGS. 13 and 14, the back-office administrator sets up the options and decisions that are available for a customer to second from once the customer has selected a general offer. These help define the decision logic and help define options such as quantity and price decisions.

Then, as shown in FIGS. 15, 16, 17, 18, and 19, the price plans used in option sets are pre-integrated back to the network and billing system. That is, various network or billing elements may be physically adjusted (e.g., programmed) to implement the offer. Through this integration, the ability to fulfill the order, and bill for services is automated. Various definitions are shown in FIGS. 16, 17, 18, and 19.

Figure 20:
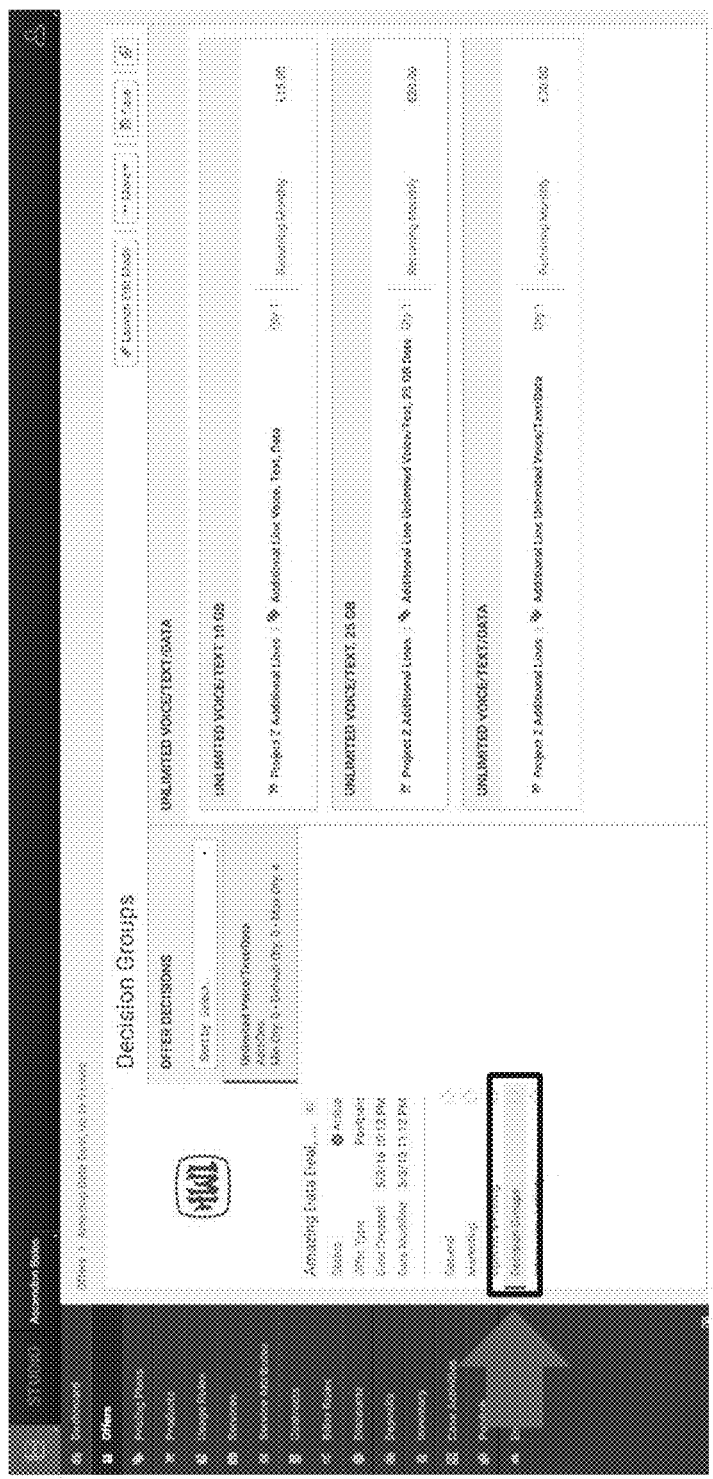
Figure 21:
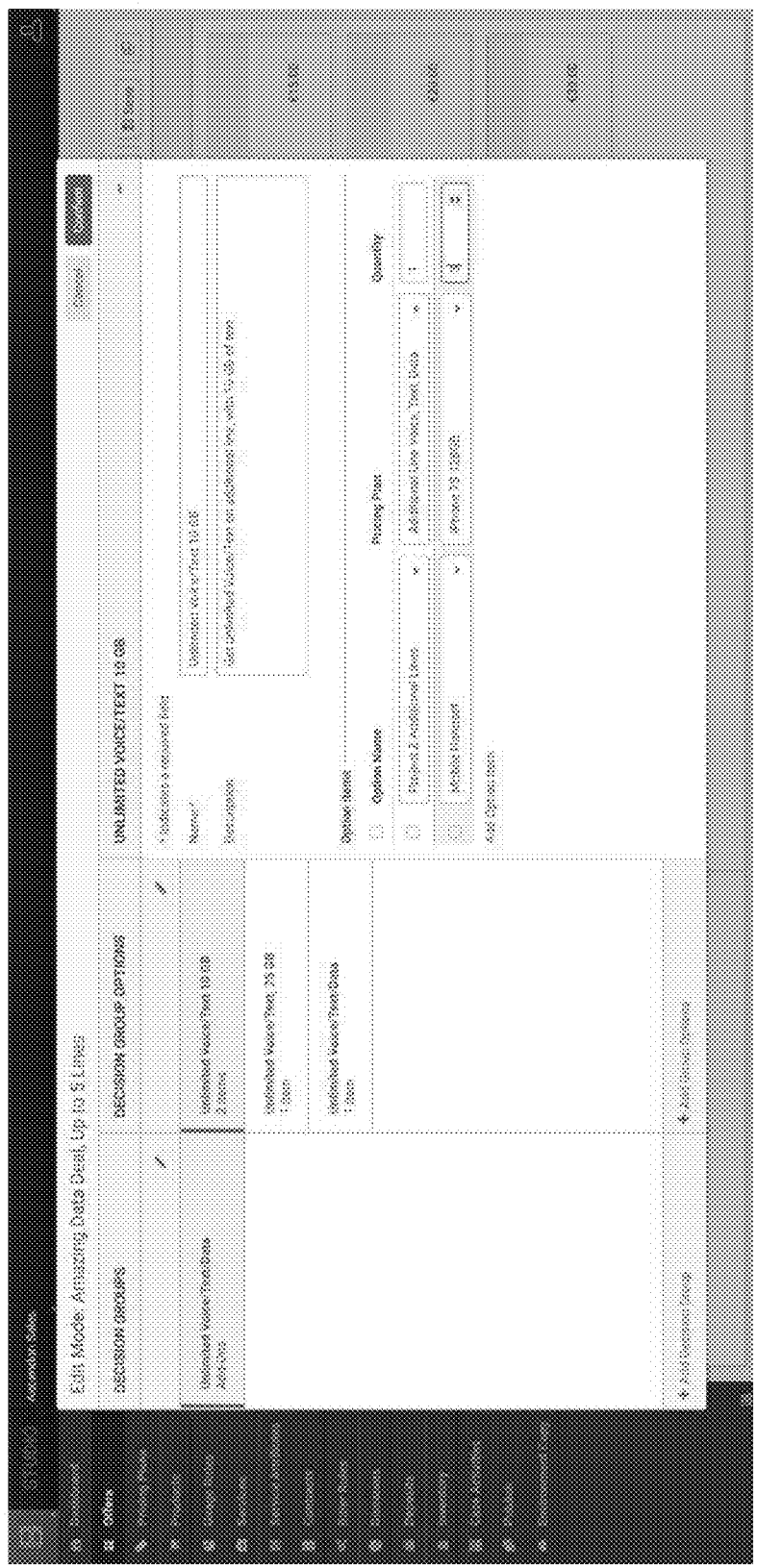

Next, as shown in FIGS. 20 and 21, the back-office administrator sets up decision groups, which support complex cardinality rules. This allows one customer decision to impact another decision. In aspects, the decisions logic is enforced through or at APIs, ensuring the user selects only the correct options.

Preferred embodiments of this disclosure are described herein, including the best mode known to the inventor(s). It should be understood that the illustrated embodiments are exemplary only and should not be taken as limiting the scope of the appended claims.

What is claimed is:

1. A system that is arranged to configure elements in an electronic communication network, the system comprising:
 a first electronic communication network;
 a second electronic communication network;
 wherein the first electronic communication network and the second electronic communication network are different electronic networks;
 wherein the second electronic communication network comprises one or more electronic elements including one or more electronic switches, routers, gateways, control circuits, memory storage devices, transmitters or receivers;
 a user electronic device including an electronic display, the user electronic device being coupled to the first electronic communication network and the second electronic communication network;
 an electronic tool, the electronic tool being deployed at a central location, the electronic tool including a transceiver circuit, a database, and a control circuit which executes decision logic, the electronic tool being coupled to the first electronic communication network and the second electronic communication network;
 wherein the electronic tool presents a plurality of general offers to a customer at the user electronic device;
 wherein the electronic tool receives a selection result from a customer at the user electronic device in response to the presentation of the general offers, the selection result being the customer's selection of one of the plurality of general offers and wherein the selection result is communicated to the control circuit via the first electronic network and transceiver circuit;
 wherein the control circuit responsively sends one or more option sets for presentation to the customer at the user electronic device;
 wherein the customer enters parameters selected from the option sets;
 wherein the transceiver circuit receives marketing data and the marketing data is stored in the database;
 wherein the control circuit is configured to execute the decision logic, execution of the decision logic being effective to construct or define an appropriate product or service offer for the customer based upon the parameters entered by the customer at the user electronic device, wherein the parameters are received from the user electronic device at the transceiver circuit via the first electronic communication network, wherein the offer incorporates at least some of the marketing data and comprises an electronic visualization of one or more products or services for sale to a customer, wherein contents of the product or service offer are tailored to an individual customer based upon the parameters received by the individual customer;
 wherein the decision logic is executable computer code and an accompanying data structure, and comprises multiple executable paths;
 wherein execution of the decision logic is dynamically monitored by the control circuit to determine the paths taken by one or more users through the decision logic, and, based upon the monitoring and an analysis of the paths taken, the decision logic is selectively and dynamically changed by the control circuit;
 wherein the selective and dynamic changing of the decision logic includes one or more of omitting an option set that can be presented to a customer, adding an option set that can be presented to a customer, changing the cost associated with an option set that can be presented to a customer, dynamically changing marketing data associated with an option set that can be presented to a customer;

wherein the product or service offer is transmitted by the transceiver circuit across the first electronic communication network and rendered on the screen of the user electronic device for viewing by the customer;

wherein the customer indicates an acceptance of the product or service offer at the user electronic device, the acceptance being transmitted via the first electronic communication network to the transceiver circuit, and wherein the transceiver circuit receives the acceptance and the control circuit responsively creates one or more electronic signals that are effective in provisioning the one or more electronic elements in the second electronic communication network to implement the product or service offer, and wherein the control circuit transmits a message to an electronic billing system via the transceiver circuit to accommodate the product or service offer;

wherein the provisioning of the one or more electronic elements comprises physically changing an operating characteristic of the one or more electronic elements including: a data transmission speed over the element, a change in state of the element, a configuration of the element allowing the element to choke data, or a configuration of the element to allow the element to halt information movement to a selected customer;

wherein the incorporation of the marketing information into the appropriate product or service offer, the provisioning of the second network, and the accommodation of billing information associated with the appropriate product or service offer are performed automatically and seamlessly with the single electronic tool without the use of other tools or processes.

2. The system of claim 1, wherein the marketing data comprises pictures, videos, text, and instructions as to picture placement.

3. The system of claim 1, wherein the parameters include a data rate or a cost of the product offer.

4. The system of claim 1, wherein a communication to implement the offer is performed automatically and seamlessly with the single electronic tool.

5. The system of claim 1, wherein the second electronic communication network is a wireless communication network.

6. The system of claim 1, wherein the first electronic communication network comprises the internet.

7. The system of claim 1, wherein the user electronics device comprises a smartphone, a laptop computer, a tablet computer, or a personal computer.

8. A method of configuring elements in an electronic communication network, the method comprising:

collecting marketing data at a single electronic tool and storing the marketing data in a database at the electronic tool;

wherein the electronic tool presents a plurality of general offers to a customer at a user electronic device;

wherein the electronic tool receives a selection result from a customer at the user electronic device in response to the presentation of the general offers, the selection result being the customer's selection of one of the plurality of general offers and wherein the selection result is communicated to the electronic tool via a first electronic network and a transceiver circuit;

wherein the electronic tool responsively sends one or more option sets for presentation to the customer at the user electronic device;

wherein the customer enters parameters selected from the option sets;

defining decision logic at the electronic tool, the decision logic allowing a customer to obtain an appropriate product or service offer based upon the parameters entered by the customer and utilized by the decision logic;

executing the decision logic at the electronic tool to obtain or define the appropriate product or service offer, the product or service offer incorporating at least some of the marketing data, the product or service offer comprising electronic visualizations of one or more products or services for sale to a customer at an electronic display at a user electronic device, wherein contents of the product or service offer are tailored to an individual customer based upon the parameters received by the individual customer;

wherein the decision logic is executable computer code and an accompanying data structure, and comprises multiple executable paths;

wherein execution of the decision logic is dynamically monitored by the electronic tool to determine the paths taken by one or more users through the decision logic, and, based upon the monitoring and an analysis of the paths taken, the decision logic is selectively and dynamically changed by the electronic tool;

wherein the selective and dynamic changing of the decision logic includes one or more of omitting an option set that can be presented to the customer, adding an option set that can be presented to the customer, changing the cost associated with an option set that can be presented to the customer, dynamically changing marketing data associated with an option set that can be presented to the customer;

at the electronic display, rendering the appropriate product or service offer that has been determined by executing the decision logic;

receiving an acceptance of the product or service offer by the customer and responsively provisioning one or more electronic elements in the second electronic communication network to implement the product or service offer, and transmitting a message to an electronic billing system to accommodate the product or service offer;

wherein the first electronic communication network and the second electronic communication network are different electronic networks;

wherein the second electronic communication network comprises one or more electronic elements including one or more electronic switches, routers, gateways, control circuits, memory storage devices, transmitters or receivers;

wherein the provisioning of the one or more electronic elements comprises physically changing an operating characteristic of the one or more electronic elements including: a data transmission speed over the element, a change in state of the element, a configuration of the element allowing the element to choke data, or a configuration of the element to allow the element to halt information movement to a selected customer;

wherein the incorporation of the marketing information into the appropriate product or service offer, the provisioning of the second electronic network, and the accommodation of billing information associated with the appropriate product or service offer are performed automatically and seamlessly with the single electronic tool without the use of other tools or processes.

9. The method of claim 8, wherein the marketing data comprises pictures, videos, text, and instructions as to picture placement.

10. The method of claim 8, wherein the parameters include a data rate or a cost of the product offer.

11. The method of claim 8, wherein a communication to implement the offer is performed automatically and seamlessly with the single electronic tool.

12. The method of claim 8, wherein the network is a wireless communication network.

13. An electronic tool that is arranged to configure elements in an electronic communication network, the electronic tool being deployed at a central location, the tool comprising:
a transceiver circuit coupled to the first electronic communication network and the second electronic communication network;
a database; and
a control circuit coupled to the database and the transceiver circuit;
wherein the control circuit presents a plurality of general offers to a customer at a user electronic device;
wherein the electronic tool receives a selection result from a customer at the user electronic device in response to the presentation of the general offers, the selection result being the customer's selection of one of the plurality of general offers and wherein the selection result is communicated to the control circuit via the first electronic network and transceiver circuit;
wherein the control circuit responsively sends one or more option sets for presentation to the customer at the user electronic device;
wherein the customer enters parameters selected from the option sets;
wherein the transceiver circuit receives marketing data and the marketing data is stored in the database;
wherein the control circuit is configured to execute decision logic, execution of the decision logic being effective to construct or define an appropriate product or service offer for the customer based upon the parameters entered by the customer at the user electronic device, the user electronic device including an electronic display;
wherein the parameters are received from the user electronic device at the transceiver circuit via the first electronic communication network, wherein the product and service offer incorporates at least some of the marketing data and comprises an electronic visualization of one or more products or services for sale to a customer, wherein contents of the product or service offer are tailored to an individual customer based upon the parameters received by the individual customer;
wherein the decision logic is executable computer code and an accompanying data structure, and comprises multiple executable paths;
wherein execution of the decision logic is dynamically monitored by the control circuit to determine the paths taken by multiple users through the decision logic, and, based upon the monitoring and an analysis of the paths taken, the decision logic is selectively and dynamically changed by the control circuit;
wherein the selective and dynamic changing of the decision logic includes one or more of omitting an option set that can be presented to a customer, adding an option set that can be presented to a customer, changing the cost associated with an option set that can be presented to a customer, dynamically changing marketing data associated with an option set that can be presented to a customer;
wherein the product and service offer is transmitted by the transceiver circuit across the first electronic communication network and rendered on the electronic display of the user electronic device for viewing by the customer;
wherein the customer indicates an acceptance of the product or service offer at the user electronic device, the acceptance being transmitted via the first electronic communication network to the transceiver circuit, and wherein the transceiver circuit receives the acceptance and the control circuit responsively creates one or more electronic signals that are effective in provisioning one or more electronic elements in the second electronic communication network to implement the product or service offer, and wherein the control circuit transmits a message to an electronic billing system via the transceiver circuit to accommodate the product or service offer;
wherein the first electronic communication network and the second electronic communication network are different electronic networks;
wherein the second electronic communication network comprises one or more electronic elements including one or more electronic switches, routers, gateways, control circuits, memory storage devices, transmitters or receivers;
wherein the provisioning of the one or more electronic elements comprises physically changing an operating characteristic of the one or more electronic elements including: a data transmission speed over the element, a change in state of the element, a configuration of the element allowing the element to choke data, or a configuration of the element to allow the element to halt information movement to a selected customer;
wherein the incorporation of the marketing information into the appropriate product or service offer, the provisioning of the second network, and the accommodation of billing information associated with the appropriate product or service offer are performed automatically and seamlessly with the single electronic tool without the use of other tools or processes.

14. The system of claim 1, wherein the marketing data comprises pictures, videos, text, and instructions as to picture placement.

15. The system of claim 1, wherein the parameters include a data rate or a cost of the product offer.

16. The system of claim 1, wherein a communication to implement the offer is performed automatically and seamlessly with the single electronic tool.

17. The system of claim 1, wherein the second electronic communication network is a wireless communication network and the first electronic communication network comprises the internet.

* * * * *